US012149992B2

(12) United States Patent
Maruyama et al.

(10) Patent No.: US 12,149,992 B2
(45) Date of Patent: Nov. 19, 2024

(54) REDUNDANT COMMUNICATION SYSTEM

(71) Applicant: Hitachi, Ltd., Tokyo (JP)

(72) Inventors: Tatsuya Maruyama, Santa Clara, CA (US); Shoji Yunoki, Santa Clara, CA (US); Taisuke Ueta, San Jose, CA (US); Hidenori Omiya, Ibaraki (JP); Yusaku Otsuka, Ibaraki (JP); Iori Kobayashi, Ibaraki (JP); Toshiki Shimizu, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 385 days.

(21) Appl. No.: 17/589,307

(22) Filed: Jan. 31, 2022

(65) Prior Publication Data
US 2023/0247496 A1    Aug. 3, 2023

(51) Int. Cl.
*H04W 36/00* (2009.01)
*H04W 4/02* (2018.01)
*H04W 4/029* (2018.01)
*H04W 40/04* (2009.01)
*H04W 72/51* (2023.01)

(52) U.S. Cl.
CPC ....... *H04W 36/0072* (2013.01); *H04W 4/027* (2013.01); *H04W 4/029* (2018.02); *H04W 40/04* (2013.01); *H04W 72/51* (2023.01)

(58) Field of Classification Search
CPC ............. H04W 36/00; H04W 36/0005; H04W 36/0055; H04W 36/0072; H04W 40/00; H04W 40/02; H04W 40/04
See application file for complete search history.

(56) References Cited

U.S. PATENT DOCUMENTS

| | | | | |
|---|---|---|---|---|
| 2007/0281712 A1* | 12/2007 | Povey | ................ | H04W 36/083 455/456.1 |
| 2017/0222912 A1* | 8/2017 | Atkinson | ............... | H04L 45/128 |
| 2018/0351806 A1* | 12/2018 | Mohanram | ......... | H04L 41/0895 |
| 2020/0084663 A1* | 3/2020 | Park | ........................ | H04W 8/08 |
| 2020/0107213 A1* | 4/2020 | Park | ........................ | H04W 4/24 |

(Continued)

OTHER PUBLICATIONS

IEC 62439-3:2016 Industrial communication networks—High availability automation networks—Part 3: Parallel Redundancy Protocol (PRP) and High-availability Seamless Redundancy (HSR), 2021, 19 pages.

(Continued)

*Primary Examiner* — Robert C Scheibel
(74) *Attorney, Agent, or Firm* — Procopio, Cory, Hargreaves & Savitch LLP

(57) ABSTRACT

A method, and apparatus for implementing the method, of resource allocation for a communication session in a network that connects a terminal device and a control device via one or more base stations is discussed herein. The method may include storing identifiers of a set of communication objects associated wide the terminal device. The method may further include acquiring information regarding a first set of resources associated with a first communication session for a first communication object in the set of communication objects. The method may also include allocating a second set of resources associated with a second communication session for a second communication object in the set of communication objects, where the second set of resources comprises a disjoint set of resources from the first set of resources.

20 Claims, 18 Drawing Sheets

(56) References Cited

U.S. PATENT DOCUMENTS

| | | | |
|---|---|---|---|
| 2021/0274419 A1* | 9/2021 | Lin ........................ | H04L 45/22 |
| 2021/0359926 A1* | 11/2021 | Miklós .................... | H04L 41/06 |
| 2022/0124570 A1* | 4/2022 | Skarin ................... | H04W 36/30 |
| 2022/0322140 A1* | 10/2022 | Yu ......................... | H04L 45/247 |
| 2022/0394593 A1* | 12/2022 | Gajic ..................... | H04L 45/24 |
| 2023/0216804 A1* | 7/2023 | Zohar .................... | H04L 45/24 |
| | | | 709/238 |
| 2024/0007925 A1* | 1/2024 | Li ......................... | H04W 76/15 |

OTHER PUBLICATIONS

3GPP TS 23.501 V17.1.1 3rd Generation Partnership Project; Technical Specification Group Services and System Aspects; System architecture for the 5G System (5GS); Stage 2 (Release 17), 2021, 526 pages.

* cited by examiner

REDUNDANT COMMUNICATION SYSTEM

BACKGROUND

Field

The present disclosure is generally directed to providing redundancy for communication between a control device and a terminal device.

Related Art

Control systems for supporting social infrastructure may include sensors, controllers, and actuators. The state of the physical world may be sensed by the sensor and may be provided to (e.g., input to) a controller. The controller may calculate a control command value for controlling the actuator. The actuator may operate on the physical world based on the command value calculated by the controller. For example, repeating a series of processes periodically performs the desired control.

Examples of such control systems can include factory automation (FA) in factories, process automation (PA) in chemical plants and others, distributed control system (DCS), power system control, power generation plant, water plant system, steel control system, and so on.

In large-scale control systems, a plurality of sensors, controllers, and actuators may be connected via a network. Such networks may be configured as a control network. A control network may be configured to satisfy time constraint requirements of the control system (e.g., a worst acceptable delay), cost, reliability, and/or other application-specific requirements.

One of the main requirements of many control systems is high reliability. One of the methods to improve reliability is the redundancy of the target element. The methods are classified into standby redundancy and continuous redundancy in accordance with the timing of enabling the redundancy. Standby redundancy is a method of switching to a redundant system when main system failures, while continuous redundancy is a method in which the main system and the redundant system are active at a same time.

In an example involving control networks, standby redundancy involves preparing two communication paths, wherein the redundant path becomes active at the time the main path fails. Sensor information from the sensors and control commands to actuators are communicated via the redundant path whenever the main path fails. On the other hand, sensor information from the sensors and control commands to actuators are communicated via both the main path and the redundant path in continuous redundancy. Receivers such as controllers and actuators take packets received earlier based on, for example, first-come priority rules. Then, they execute processing according the received information.

Through standby redundancy implementations, such as N+1 redundancy, it is possible to increase the reliability at low cost. However, abnormality detection with the timeout method and switches to the redundant system cause nonzero dead time. Such implementations may lower availability of the control system. In contrast, continuous redundancy does not cause such dead time, but requires additional process such as fast received packet detection. Further, both redundant methods must satisfy the time constraints imposed on the control system.

In recent years, 5G has been considered as a wireless standard intended to be applied to control systems. In particular, function group intended to be applied to a control use-case called Ultra Low Latency and Reliable Communications (URLLC), shortening the delay and high reliability are targeted. However, URLLC may be inadequate to fully meet demands in mission-critical control systems which require extremely high communication reachability.

To address the issues in the related art, example implementations involve a planning apparatus (e.g., a communication control device) for the resource allocation of a communication session in a network that connects a terminal device and a control device via base stations.

SUMMARY

Example implementations descried herein include an innovative method of providing redundancy via a planning apparatus. The method may include storing identifiers of a set of communication objects (e.g., wireless communication devices, user equipments (UEs), etc.) associated with a terminal device. The method may further include acquiring information regarding a first set of resources associated with a first communication session for a first communication object in the set of communication objects. The method may also include allocating a second set of resources associated with a second communication session for a second communication object in the set of communication objects, where the second set of resources includes a disjoint set of resources from the first set of resources.

Example implementations described herein include an innovative computer-readable medium storing computer executable code for resource allocation of a communication session in a network that connects a terminal device and a control device via one or more base stations. The code when executed by the processor may cause the processor to store identifiers of a set of communication objects associated with the terminal device. The code when executed by the processor may further cause the processor to acquire information regarding a first set of resources associated with a first communication session for a first communication object in the set of communication objects. The code when executed by the processor may cause the processor to allocate a second set of resources associated with a second communication session for a second communication object in the set of communication objects, wherein the second set of resources includes a disjoint set of resources from the fast set of resources.

Example implementations described herein include an innovative system for resource allocation of a communication session in a network that connects a terminal device and a control device via one or more base stations. The system may include means for storing identifiers of a set of communication objects associated with a terminal device. The system may also include means for acquiring information regarding a first set of resources associated with a first communication session for a first communication object in the set of communication objects. The system may further include means for allocating a second set of resources associated with a second communication session for a second communication object in the set of communication objects, where the second set of resources includes a disjoint set of resources from the fit set of resources.

DETAILED DESCRIPTION

Figure 1:
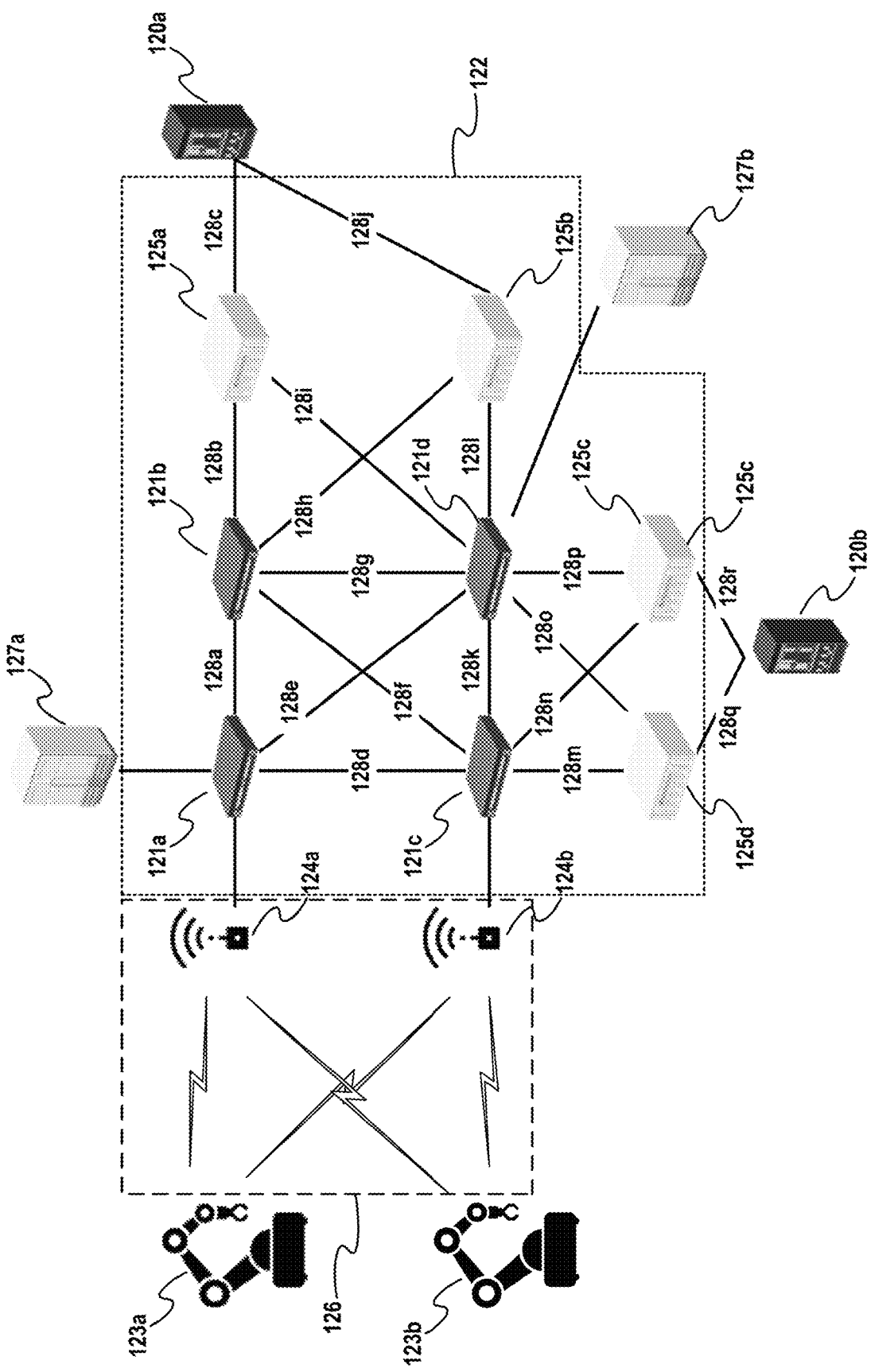
FIG. 1 illustrates an example configuration of a control system including a planning apparatus in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein relate to an innovative planning apparatus for resource allocation for a communication session in a network that connects a terminal device and a control device via one or more base stations. The planning apparatus may be configured to store identifiers of a set of communication objects associated with the terminal device. The planning apparatus may further be configured to acquire information regarding a first set of resources associated with a first communication session for a first communication object in the set of communication objects. The planning apparatus may also be configured to allocate a second set of resources associated with a second communication session for a second communication object in the set of communication objects, where the second set of resources is a disjoint set of resources from the first set of resources.

FIG. 1 illustrates an example configuration of a control system including a planning apparatus in accordance with an example implementation. Control devices 120a and 120b may communicate with one or more of terminal device 123a or terminal device 123b via control network 122 (e.g., the network including network relay devices 121a-121d and user plane functions 125a-125d) and wireless network 126. Control device 120a or 120b may transmit and/or receive communication packets with terminal devices 123a and/or 123b to (1) transmit contrail command values for controlling terminal devices 123a and/or 123b, (2) acquire measurement values and/or sensor information from components such as sensors or actuators of the terminal devices 123a and/or 123b, or (3) acquire and/or configure various settings of the terminal devices 123a or 123b.

Control devices 120a and 120b may be implemented as part of a distributed control system (DCS) which may exchange sampling data, control commands, and/or state signals in a control system. The data in the control system can be integrated in a packet. Control device 120a and/or 120b, in some aspects, may be implemented as a virtualized control device and/or as a software container providing the control device functionality. In some aspects, applications or an Operating System (OS) may be managed as a container by the virtual anion.

Depending on the desired implementation, the physical implementation of control device 120a or 120b can involve a dedicated controller, an industrial Personal Computer (PC), a control computer, a DCS controller, a Multi-access Edge Computing (MEC) device, a computer cloud, a server computer, a SCADA (Supervisory Control and Data Acquisition) server, a PLC (programmable logic controller), an IED (intelligent electronic device), a protection relay, and so on. Alternatively, a configuration where such devices are deployed in a destination network (DN) defined in 5G standards is exemplified as well.

Network relay devices 121a-121d, in some aspects, may be relay devices in the control network 122. Packets communicated among the control devices 120a and/or 120b, the terminal devices 123a and/or 123b, and the network relay devices 121a-121d, in some aspects, may be routed and transferred.

Depending on the desired implementation, the physical in implementation of a network relay device 121a-121d may be in the form of a Time Sensitive Network (TSN)-compatible switch, a network switch including a L2 switch or a L3 switch, a Software Defined Network (SDN)-compatible device, a Network Function Virtualization (NFV)-compatible device, a bridge, a router, an IEEE 1588 TC (Transparent Clock) or BC (Boundary Clock), an OpenFlow™ switch, a RedBox or a QuadBox defined by IEC 62439-3, an optical switch, an optical oscillator, and/or other various network relay apparatuses.

Control Network 122, in some aspects, may be a network for connecting the control devices 120a and/or 120b, the network relay devices 121a-121d, the terminal devices 123a and/or 123b, and the communication control devices 127a and/or 127b (e.g., a planning apparatus). The physical implementation of the control network 122 can be compatible with one or more of the IEEE 802.3 (Ethernet) standard; the IEC 61784 standard; the IEC 61784-2 Communication Profile Family 12 (hereinafter, EtherCAT™) standard; various industrial networks including the control network defined in the IEC 61158 standard; IEEE communication standards related to TSN; a wireless network such as a core network of 4G, 5G, and/or 6G; the DNP (Distributed Network Protocol) 3 standard; the IEC 61970 standard; the HSR (High availability Seamless Redundancy) and PRP (Parallel Redundancy Protocol) in the IEC 62439-3 standard; a duplex network; a ring network; the IEEE 802.17 RPR standard; a CAN™ (Controller Area Network); a DeviceNet; the RS-232C standard; the RS-422 standard; the RS-485 standard; the ZigBee™ standard; the Bluetooth™ standard; the IEEE 802.15 standard; the IEEE 802.1 standard; mobile communications; ECHONET Lite™; OpenADR™; OpenFlow™; and/or various wireless communication such as WiFi™ and/or an industrial wireless network.

In addition, IEC 61850, OPC UA (Unified Architecture), DDS (Data Distribution Service), IEC 61850-7-420, IEC 60870-5-104, communication protocols based on Service Based Interface (SBI), REST API, HTTP/2, OpenAPI, exchange of JSON are examples of the upper layer protocol. Alternatively, the above-mentioned protocols may be layered. For example, the contents of the data are in the TSN packet is exemplified to apply the OPC UA standard.

Terminal device 123a and/or 123b, in some aspects, may be a device such as a sensor or an actuator. It may be controlled and configured in accordance with a control command received from a control device 120a and or 120b via the control network 122. Further, the terminal device 123a and/or 123b may transmit its state and information to the control device 120a and/or 120b via the control network 122. Terminal device 123a and/or 123b may be configured to provide information (e.g., input to a control device 120a and/or 120b) as a sensor, to receive information (e.g., output from the control device 120a and/or 120b) as an actuator, or may combine both transmission and/or reception (e.g., input and/or output) functions in accordance with the desired implementation.

Examples of terminal device 123a and/or 123b can involve an industrial robot such as a mobile robot, a humanoid robot, a robotic arm, an Automated Guided Vehicle (AGV), an Autonomous Mobile Robot (AMR), an autonomous mobile object, a remote-controlled mobile object, a chip mounter, a machine tools table, processing equipment, a machine tool, semiconductor manufacturing equipment, a motor or an inverter in a manufacturing device, power equipment such as a circuit breaker and a disconnector, various sensor (encoders, temperature sensors, pressure sensors, etc.), and so on in accordance with the desired implementation. Alternatively, a terminal device 123a and/or 123b may be implemented as a dedicated controller, an industrial PC, a control computer, a DCS controller, a SCADA device, a PLC, a terminal device such as smartphone and UE equipped with a wireless communication interface, an IED, a merging unit (MU), and/or a protection relay. For convenience, a terminal device 123a and/or 123b may be described as a single device, but may consist of controllers, sensors, actuators, and a communication device such as a UE used in mobile communication.

Wireless base station 124a and/or 124b, in some aspects, may be a base station for wireless communication and may communicate with the terminal device 123a and/or 123b as a mobile object without a wired connection via the wireless network 126. In addition, the wireless base station 124a and/or 124b may communicate with the control device 120a and/or 120b and communication control device 127a and/or 127b via the control network 122. Examples of wireless network 126 may involve a base station of a 4G network, a 5G network, a 6G network, industrial wireless communication such as WirelessHART and ISA100, and so on. Wireless base station 124a and/or 124b may include multiple devices such as a Baseband Unit (BU), a Remote Radio Head (RRH), a Central Unit (CU), and/or a Distributed Unit (DU) in accordance with a configured option associated with a Function Split (FS).

Userplane function 125a-125d, in some aspects, may be a termination device in the control network 122, to realize a function for connecting the control device 120a and/or 120b. Another aspect of a user plane function, in some aspects, may be the termination or relay of a specific layer in a communication protocol stack constituting the control network 122. In some aspects, the network relay device 121a-121d and the user plane function 125a-125d are distinguished by being associated with different protocol stacks. Relay (or forwarding) devices in the control network 122, in some aspects, may include network relay devices similar to network relay devices 121a-121d, user plane functions similar to user plane functions 125a-125d, or a combination of network relay devices and user plane functions depending on the protocol structure of the control network 122. Depending on the desired implementation, the physical implementation of the user plane function 125a-125d can involve a network switch, a router, a SDN switch, an OpenFlow™ switch, one function configured on a NFV, a server, a software instance configured in the cloud, and/or a software container.

Wireless network 126 is a wireless network for connecting the wireless base station 124a and/or 124b and the terminal device 123a and/or 123b. Depending on the desired implementation, the physical implementation of the wireless network 126 can be in the form of mobile radio communication such as 3G, 4G (LTE, etc.), 5G (including New Radio system), and 6G, wireless communication such as WiFi™, ZigBee™, Bluetooth™, and/or IEEE 802.15. While FIG. 1 lustrates a wireless network 126 is used to connect the control network 122 to the terminal device 123a and/or 123b, in some aspects the terminal device 123a and/or 123b may be connected to the control network 122 by a wired communication, e.g., Ethernet, USB, and/or other wired communication.

Communication control device 127a and/or 127b, in some aspects, may be a device for executing various control functions for the control system shown in FIG. 1. Such functions may include authentication of the terminal device 123a and/or 123b, session management in the control network 122, the management of functions in the control network 122, instantiation and management of the functions executed in the communication control device 127a and/or 127b. The network functions (NF) and application functions (AF) defined in 5G standard can be examples of the functions implemented in the communication control device 127a and/or 127b. Depending on the desired implementation, the physical implementation of the communication control device 127a and/or 127b can involve a PC, a dedicated controller, an industrial PC, a control computer, a DCS controller, a MEC device, a computer cloud, a server computer, an instance or software container instantiated on a server or cloud, and so on.

Though the communication path between the communication control device 127a and 127b and the network relay device 121a and 121d, respectively, is illustrated as a single connection, any number of paths may be used to achieve redundancy. Each of communication links 128a-128r may be a communication link connecting any of the control device 120a and/or 120b, the network relay device 121a-121d, the wireless base station 124a and/or 124b, the user plane function 125a-125d, the communication control device 127a and/or 127b, and constitutes the control network 122. Communication link, as used herein, may refer to a communication link (e.g., communication links 128a-128r) between neighboring communication devices (e.g., network relay devices 121a to 121d, wireless base stations 124a and 124b, a user plane function 125a-125d, and/or a communication control device 127a and 127b). Communication path may refer to a route composed of a set of communication links (e.g., communication links 128a-128r).

In some aspects, the number, and configuration, of the network relay devices and/or user plane functions may be different from the number, and configuration, of the network relay devices and/or the user plane functions illustrated in FIG. 1 based on the desired implementation. Similarly, the number of communication paths between a control device 120a and/or 120b and a terminal device 123a and/or 123b may be different from each other and from the number of communication paths illustrated in FIG. 1. While in FIG. 1 the control device 120a and/or 120b and the terminal device 123a and/or 123b are illustrated as separate devices, in some aspects a communication device may involve both roles in one device depending on the desired implementation. In some aspects, there may be one or more control devices (e.g., control devices 120a and/or 120b) in the control system.

Examples of the control system shown in FIG. 1 may include a DCS for FA and PA, a remote control system using wireless communication, monitoring and protection control systems in power systems, industrial equipment, semiconductor manufacturing equipment, in-vehicle systems, control systems in construction machinery and railway vehicles, a railway ground signal system, aviation control systems, and so on. In some aspects, an Internet of Things (IoT) system may be used to improve the performance of the control system by applying artificial intelligence to information collected via the control network 122 at the control device 120a and/or 120b and/or at the communication control device 127a and/or 127b or a cloud or a computer is also applicable. These examples may involve local 5G, private 5G, and public 5G system.

In the system shown in FIG. 1, terminal device 123a and/or 123b are illustrated as connecting to wireless base stations 124a and 124b, but a UE may fulfill the function of the terminal device or the wireless base station of the network and the UE may communicate with other communication terminals such as smartphone or AGV. In such a system, connecting from each communication terminal to a plurality of UEs allows to grant the effect of the invention between the communication terminal and control device 120. If each communication terminal connects with one UE, the effect of the invention is provided between the UE and control device 120.

Figure 2:
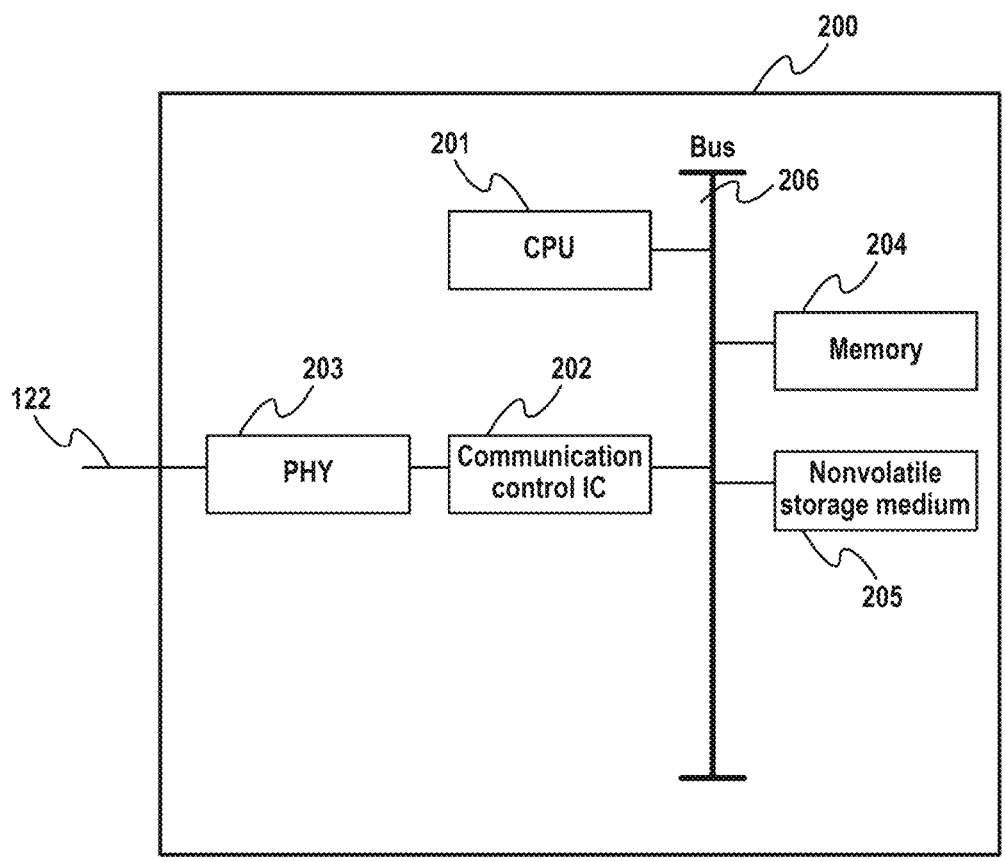
FIG. 2 illustrates the hardware structure of a device, in accordance with an example implementation.

FIG. 2 illustrates the hardware structure of a device 200, in accordance with an example implementation. Device 200 may be a control device (e.g., control device 120a and/or 120b of FIG. 1) and/or a communication control device (e.g., communication control device 127a and/or 127b). In some aspects, the hardware structure may include a Central Processing Unit (CPU) 201 that may be configured to transfer programs from the nonvolatile storage median 205 to the memory 204 and executes the programs. The OS and application programs operating on the OS are exemplified as the execution programs. Programs operating on the CPU 201 operate settings of the communication control integrated circuit (IC) 202 and obtain the state information.

Communication control IC 202 may receive transmission requests and transmission data from software running on the CPU 201, and may transmit data to the control network 122 using physical layer (PHY) 203. Also, the communication control IC 202 may transfer the data received from the control network 122 to the CPU 201, the memory 204, and/or the nonvolatile storage medium 205 via the bus 206. An implementation of the communication control IC 202 is an FPGA (Field Programmable Gate Array), a CPLD (Complex Programmable Logic Device), an ASIC (Application Specific Integrated Circuit), an IC such as gate arrays, and so on in accordance with the desired implementation. In some aspects, the communication control IC 202 may be integrated with, or be implemented by, the CPU 201. The communication control IC 202 may be an IEEE 802.3 communication device including MAC layer and/or PHY layer. The implementation of the communication control IC 202 may be an IEEE 802.3 MAC (Media Access Control) chip, a PHY (physical layer) chip, and/or a MAC/PHY composite chip. In some aspects, the communication control IC 202 may be included in CPU 201 or a chip set that controls the information path inside a computer. Further, in the structure of FIG. 2, only the single communication control IC 202 is shown, but there may be a plurality of communication control ICs.

In some aspects, PHY 203 may be a transceiver IC that implements the communication function with the control network 122. The communication function provided by PHY 203 may be based on the IEEE 802.3 communication standard. In the structure of FIG. 2, the PHY 203 and the communication control IC 202 are connected and the IEEE 802.3 MAC processing is included in the communication control IC 202. However, in some aspects, a MAC function IC may be placed between the communication control IC 202 and PHY 203, or the PHY 203 may be incorporated into the communication control IC 202. While FIG. 2 illustrates a single PHY 203, other implementations may include multiple PHY components.

The memory 204, in some aspects, may be a temporary storage area for CPU 201 to operate. For example, the memory 204 may store OS and application programs transferred from the nonvolatile storage medium 205. Nonvolatile storage medium 205, in some aspects, may be a storage for information used to store programs for operating the CPU 201 such as an OS, applications, and device drivers among other data and may abo store execution results of the programs. Examples of the nonvolatile storage medium 205 can involve a hard disk drive (HDD), a solid state drive (SSD), and/or a flash memory. Further, nonvolatile storage medium 205 can be implemented as an external removable storage medium such as floppy disk (FD), CD, DVD, Blu-Ray™, USB memory, compact flash, and so on.

Bus 206 connects the CPU 201, the communication control IC 202, the memory 204, the nonvolatile storage medium 205. Examples of bus 206 can include a Peripheral Component Interconnect (PCI) Bus, Industry Standard Architecture (ISA) bus, PCI Express bus, system bus, memory bus, and so on. The device 200 implementing a control device may include a plurality of communication interfaces of the communication control IC 202 and PHY 203 for high reliability based on communication path redundancy. In some aspects, the device 200 implementing a communication control device may include a single communication interface of communication control IC 202 and PHY 203 and reliability may be provided by providing a plurality of communication control devices.

Figure 3:
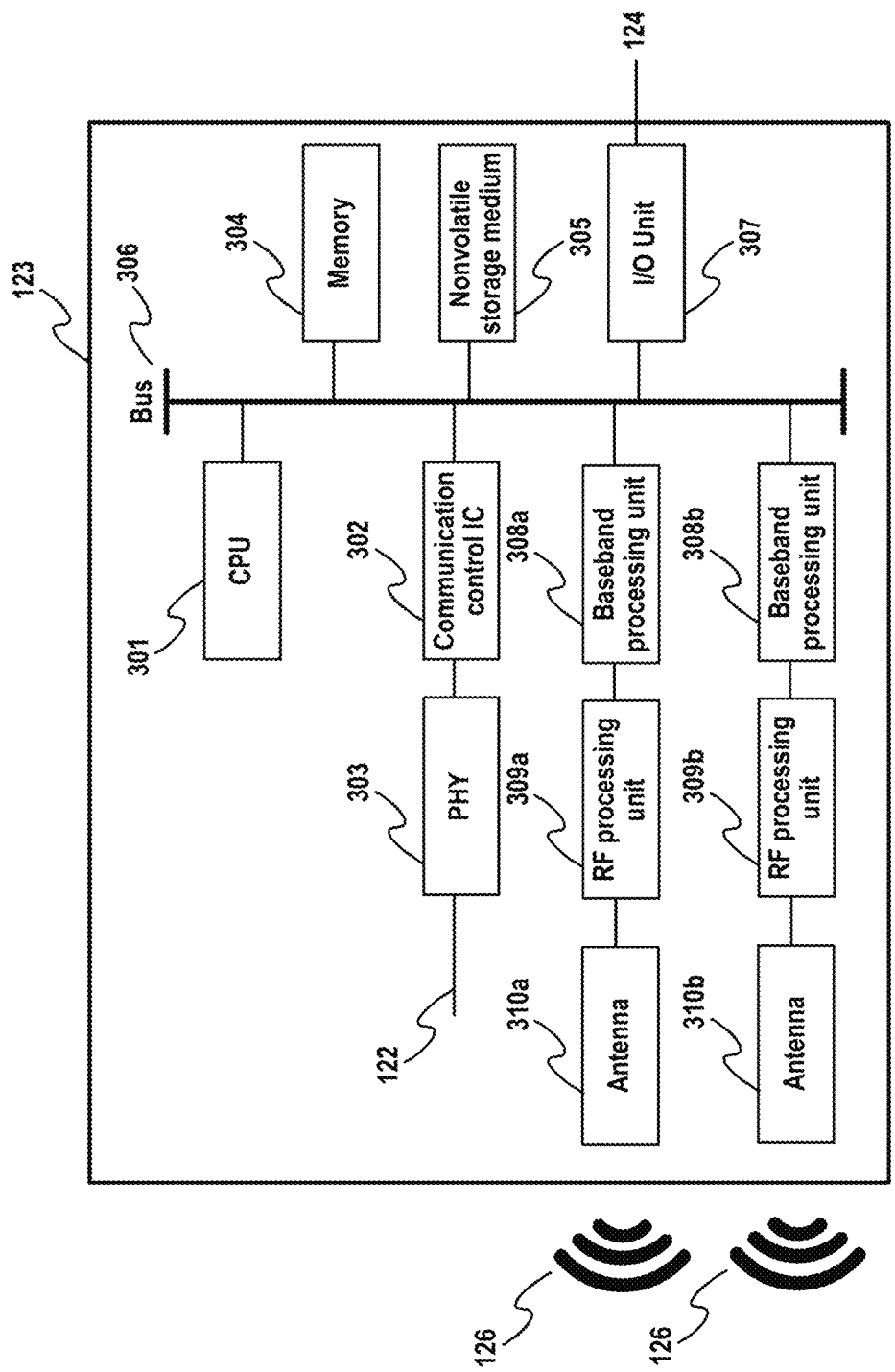
FIG. 3 illustrates the hardware structure of the terminal device, in accordance with an example implementation.

FIG. 3 illustrates the hardware structure of the terminal device 123, in accordance with an example implementation. Input/output (I/O) unit 307 is an input-output interface for controlling actuators associated with the terminal device 123 or acquiring a sensed value from sensors associated with the terminal device 123. Examples of I/O unit 307 can involve digital DO interfaces, analog I/O IC, and driver IC. Although the signal line from the I/O unit 307 is shown in singular, there can be a plurality of lines depending on the terminal device 123. Also, a plurality of the I/O units 307 may be included in the terminal device 123. The I/O unit 307, in some aspects, may be configured to input information from a connected and/or associated sensor, to output a command and to a connected and/or associated actuator, or may combine both input and output functions in accordance with the desired implementation.

Baseband processing unit 308a and/oar 308b may be configured to convert analog and digital signals with a radio frequency (RF) processing unit 309a and/or 309b and execute the signal processing of the digital data. Examples of signal processing include Fast Fourier Transform (FFT) of Orthogonal Frequency Division Multiplexing (OFDM), matrix calculation in MIMO signals, and error correction. Depending on the desired implementation, the physical implementation of baseband processing unit 308a and/or 308b can involve a dedicated IC, an FPGA, a CPLD, an ASIC, an IC such as gate arrays, and so on. Alternatively, it may be constituted by integrating with the CPU 301 or/and RF processing unit 309a and/or 309b.

RF processing unit 309a and/or 309b, in some aspects, may perform radio frequency processing such as modulation of the analog RF signal, amplification of a high-frequency signal, switching of radio frequency, and/or a filter function. For example, the RF processing unit 309a and/or 309b may be implemented as a dedicated IC. Antenna 310a and/or 310b may be an antenna device according to the standard of the wireless network 126.

In order to communicate with a set of two or more wireless base stations (e.g., wireless base stations 124a and 124b), some aspects may include more than two of each of the baseband processing unit 308a and/or 308b, the RF processing unit 309a and/or 309b, and the antenna 310a and/or 310b that are illustrated in the configuration of FIG. 3. In some aspects, a plurality of terminal devices 123 with a baseband processing unit 308a and/or 308b, a RF processing unit 309a and/or 309b, and an antenna 310a and/or 310b are connected via inter-chip communication means (not shown) for cooperation. A plurality of such terminal devices 123, in some aspects, are connected with an integration hardware (e.g., the structure of FIG. 2 and FIG. 3) via inter-chip communication means, then the integration hardware may control them.

In some aspects, the hardware components (e.g., the I/O unit 307, the baseband processing unit 308a and/or 308b, the RF processing unit 309a and/or 309b, and/or the antenna 310a and/or 310b) may be implemented as separate components that are connected by a network via the PHY 303, or by inter-chip communication means (not shown) to the other components of the terminal device 123 illustrated in FIG. 3.

Figure 4:
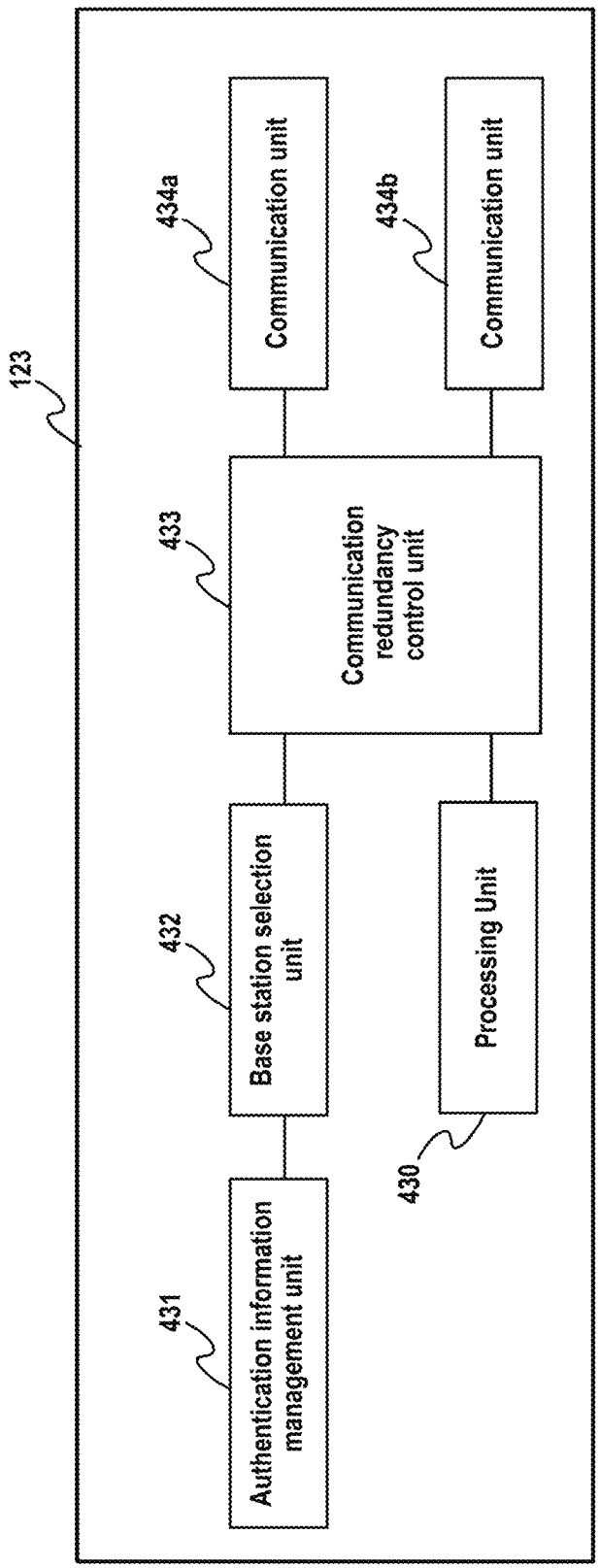
FIG. 4 illustrates the functional structure of the terminal device, in accordance with an example implementation.

FIG. 4 illustrates the functional structure of the terminal device 123, in accordance with an example implementation. Processing unit 430, in some aspects, may execute processing such as control operation and information processing. In an example of the control operation, the processing unit 430 in the terminal device 123 outputs the command value to actuators with the I/O unit 307 in accordance with command value received from a control device (e.g., control device 120a and/or 120b of FIG. 1), or control algorithm by the terminal device 123 itself. For the operation of these command values, the processing unit 430 may use sensor signals received from the I/O unit 307. The processing unit 430, in some aspects, may transmit information regarding sensor signals received from the I/O 307 to the control device 120.

In some aspects, transmitting the information regarding sensor signals received from the I/O 307 to the control device 120 includes transmitting received data. However, in some aspects, the processing unit 430 in the terminal device 123 may acquire state information or sensor information via the I/O unit 307, apply processing to the information, and transmit the processed information to the control device 120. For example, the processing may include a filtering operation, statistical processing, and/or a statistical calculation for a set of the sensor information for a specified time in the past. Other processing examples may include control processing based on control theory such as feedback control theory and/or feed forward control theory or a control operation based on artificial intelligence (AI) or machine learning. For example, integral control and a state-machine-based control method, which changes its state depending on the past information and input, may be used. Other processing examples may involve asset management such as failure detection or risk state estimation, device management and software version control (software version management and updating, etc.), predictive and preventive maintenance, Condition Based Maintenance (CBM), and statistical calculation by AI or machine learning for a remaining life prediction for the terminal devices 123.

Processing unit 430 may also be configured to calculate a command value required for controlling the terminal device 123. For example, the terminal device 123 may calculate a moving direction and a target position, speed control, acceleration control, stop, deceleration, and so on if the terminal device 123 is a mobile object. For example, if the terminal device 123 is an industrial robot arm, the terminal device 123 may calculate control commands for the motor of each joint, control of the end position of the robot arm, and trajectory control of the robot arm. The terminal device 123 may be any of a wide variety of devices, e.g., a complex device such as an industrial robot to a simple sensor or actuator, and the processing unit may be configured to execute control in accordance with the type of the terminal device 123. Processing unit 430 may be implemented by the CPU 301 or one or more applications running on the CPU 301.

The authentication information management unit 431 manages the identification information for authenticating a communication object to be assigned communication resources (e.g., a communication path including a set of network relay devices and/or user plane functions and, in some aspects, a base station) in the system shown in FIG. 1. The information managed by the authentication information management unit 431 may include additional information used in authentication. Depending on the desired implementation, the physical implementation of the authentication information management unit 431 can involve a SIM (Subscriber Identity Module) card, a UIM (User Identity Module) card, and a reading and writing device for those IC cards. Other implementations may involve a UICC (Universal Integrated Circuit Card), a USIM (Universal Subscriber Identity Module), an IMSI (International Mobile Subscriber Identity), a SUPT (Subscription Permanent Identifier), a NAI (Network Access Identifier), identification information of subscriber or contractor such as a SUCK (Subscription Concealed Identifier), and/or a temporary identifier generated during operation.

In the present invention, the identification information to be managed in the authentication information management unit 431 may include separate identification information for two or more communication units (e.g., communication units 434a and 434b) in order to achieve high reliability of communication by using two or more communication paths. For example, each identification information for two or more communication units may include a virtual identifier independent of a physical function or component. Each identification information may be associated with a communication path or communication session by the communication control unit 127. The authentication information management unit 431 may apply security measures to protect from, or to prevent, one or more of eavesdropping, tampering, spoofing, and/or denying. The authentication information management unit 431 may be implemented by one or more of the CPU 301, the memory 304, the nonvolatile storage medium 305, and an expansion unit (not shown) connected via the I/O unit 307. Examples of the expansion unit connected via the I/O unit 307 may include a PCI expansion board if the I/O unit is PCI bus or a USB Memory and USB dongle device if the I/O unit is USB.

Base station selection unit 432 may be configured to select a wireless base station (e.g., wireless base station 124a and/or 124b of FIG. 1) with which each communication unit (e.g., communication units 434a and 434b) connects. The base station selection unit 432 may be configured to select a different wireless base station for connecting to each, or at least two, of the communication units of the terminal device 123 (e.g., communication units 434a and 434b). By selecting different wireless base stations for each communication unit of the terminal device 123, the base station selection unit 432 may avoid a single point of failure on the communication path. In addition, the base station selection unit 432 may communicate required information for allocating communication resources on the system shown in FIG. 1 with the wireless base station 124a and/or 124b, the communication control device 127a and/or 127b, and/or the control device 120a and/or 120b. Base station selection unit 432, in some aspects, may further be configured to communicate with the authentication information management unit 431 to acquire authentication information for authentication by the wireless base station 124a and/or 124b, the communication control device 127a and/or 127b, anon/or the control device 120a and/or 120b. The base station selection unit 432, in some aspects, may be implemented by one or more of the CPU 301, applications running on the CPU 301, and/or the communication control IC 302.

Communication redundancy control unit 433 may be configured to process data or packets that have been transmitted from the processing unit 430 and base station selection unit 432, and may transmit them to the communication unit 434a or 434b. The processing at the communication redundancy control unit 433 may include generating a frame from the data, duplicating the data or the packet, adding a predetermined tag, and/or calculating and adding of abnormal diagnostic data such as cyclic redundancy check (CRC). Examples of appended tags for transmission can involve a virtual local area network (VLAN) tag defied in IEEE 802.1Q, a tag defined in IEEE 802.1CB, a HSR tag and/or a PRP tag defined in IEC 62439-3, and so on in accordance with the desired implementation. VLAN tag settings, in some aspects, may include settings for a PCP (Priority Code Point) and/or a VID (VLAN Identifier).

In some aspects, the communication redundancy control unit 433 may also be configured to process data received from a communication unit (e.g., a communication unit 434a and/or 434b) and transmit the data to the processing unit 430 and/or base station selection unit 432 according to a predetermined rule. The communication redundancy control unit 433 may further be configured to remove tags from the received packets and extract data from the received packets. Further, the communication redundancy control unit 433 may select one of the processing unit 430 or the base station selection unit 432 as a destination for the received data based on the contents of the received data and/or the communication unit (e.g., one of the communication units 434a or 434b) that received the packet. In some aspects, the communication redundancy control unit 433 may select one of the processing unit 430 or the base station selection unit 432 as a destination for the received data based on a state. For example, the received data may be transferred to the base station selection unit 432 if communication resources for a communication unit are not reserved yet.

Furthermore, the communication redundancy control unit 433 may execute a first packet reception that discards duplicate packets (e.g., packets that are determined equal by comparing specified parameters of the packet) that are received after the first packet. For example, packets are determined equal if the source MAC address and the sequence number on the tag are the same value in IEC62439-3. For a fast-come determination, the communication redundancy control unit 433 may haw storage (not shown) for storing the processed packets, source MAC address, and/or information on the tag. In some aspects, communication redundancy control unit 433 may replicate a packet and transfer the replicated packet to a plurality of communication units (e.g., communication units 434a and 434b) or transfer the replicated packet to a specify communication unit (e.g., one of communication units 434a or 434b).

The communication unit associated with a packet may be based on information in the packet or may be based on a function that generates the packet. In some aspects, the communication unit associated with a packet may be specified according to a state such as an establishment state of a session in the control network 122 and/or a selection state of the wireless base station 124. For example, the communication redundancy control unit 433 may select a particular communication unit (e.g., one of communication units 434a or 434b) that establishes a connection with a specific wireless base station or to select a particular communication unit that has been allocated a communication path and communication resources in the control network 122. The communication redundancy control unit 433, in some aspects, may be implemented by one or more date CPU 301, applications running on the CPU 301, the communication control IC 302, and the PHY 303.

Each communication unit (e.g., communication units 434a and 434b) may connect with the wireless network 126 and communicate in accordance with the communication protocol of the wireless network 126. A communication unit, in some aspects, connects with the PHY 303 to transmit and/or receive data and processes the data or packets that have been received from the bus 306. The processing at the communication unit may include generating a frame from the data and/or calculating and adding of abnormal diagnostic data such as CRC. A communication unit may be configured to transfer a received packet to the communication redundancy control unit 433 on reception. While two communication units (e.g., communication units 434a and 434b) are shown in FIG. 4, three or more communication units may be included in a terminal device 123. The communication unit may be implemented by one or more of applications running on the CPU 301, the communication control IC 302, and the PHY 303.

Figure 5:
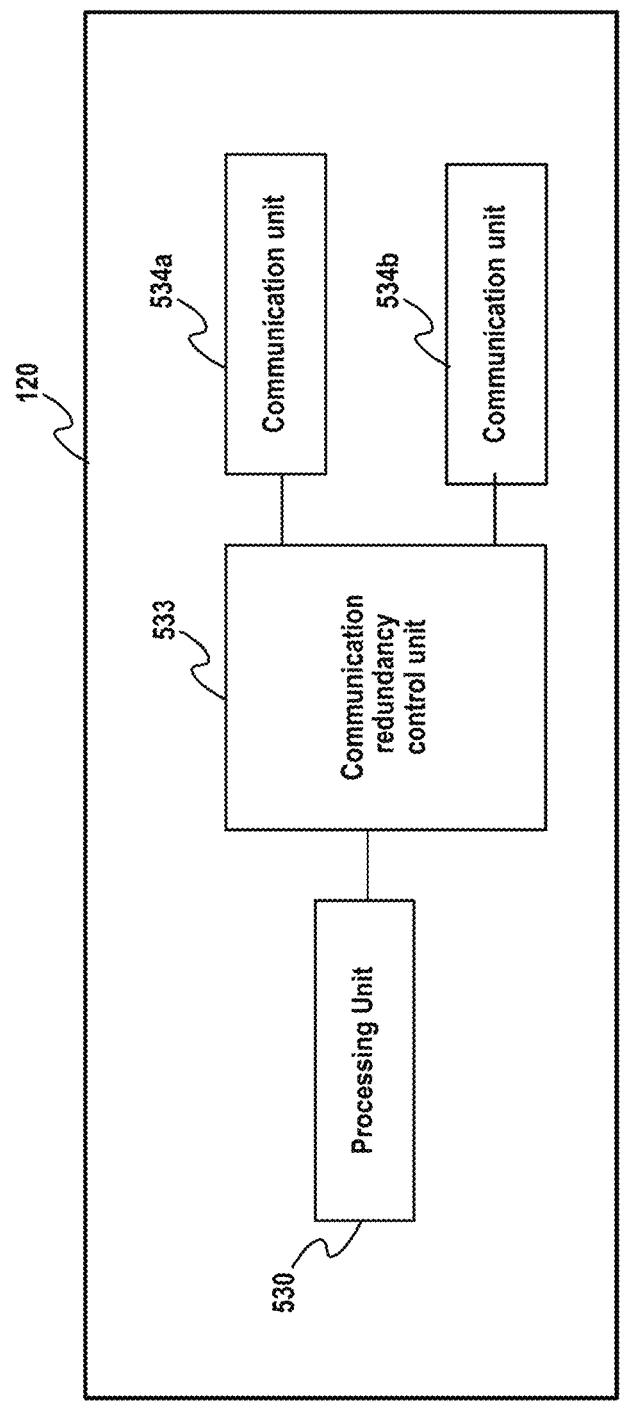
FIG. 5 illustrates the functional structure of the control device, in accordance with an example implementation.

FIG. 5 illustrates the functional structure of the control device 120, in accordance with an example implementation. In some aspects, the processing unit 530 operates as described above in relation to processing unit 430 of FIG. 4. In addition, the processing unit 530 may execute control processing according to the information transmitted from the terminal device 123. For example, processing unit 530 may be configured to receive data (e.g., a signal from a sensor) from a terminal device 123 (e.g., from a sensor of the terminal device 123). The processing unit 530 may further be configured to generate (e.g., calculate) a control command value fir controlling the terminal device 123 or an actuator of the terminal device 123. The control command value may be generated an/or calculated based on the received sensor data.

Communication redundancy control unit 533 may be configured to process data or packets that have been transmitted from the processing unit 530, and may transmit them to one or both of the communication units 534a and 534b. The processing at the communication redundancy control unit 533 may include generating a frame from the data, duplicating the data or the packet, adding a predetermined tag, and/or calculating and adding of abnormal diagnostic data such as CRC. Examples of appended tags for transmission can involve a VLAN tag defined in IEEE 802.1Q, a tag defined in IEEE 802.1CB, a HSR tag and/or a PRP tag defined in IEC 62439-3, and so on in accordance with the desired implementation. VLAN tag settings, in some aspects, may include settings for a PCP (Priority Code Point) and/or a VID (VLAN Identifier).

In some aspects, the communication redundancy control unit 533 may also be configured to process data received from a communication unit (e.g., a communication unit 534a and/or 534b) and transmit the data to the processing unit 530 according to a predetermined rule. The communication redundancy control unit 533 may further be configured to remove tags from the received packets and extract data from the received packets. In some aspects, communication redundancy control unit 533 may replicate a packet and transfer the replicated packet to a plurality of communication units (e.g., communication units 534 and 534b) or transfer the replicated packet to a specific communication unit (e.g., one of communication units 534a or 534b). The communication redundancy control unit 533, in some aspects, may be implemented by one or more of the CPU 201, applications running on the CPU 201, the communication control IC 202, and the PHY 203.

Each communication unit (e.g., communication units 534a and 534b) may connect with the control network 122 and communicate in accordance with the communication protocol of the control network 122. A communication unit, in some aspects, connects with the PHY 203 to transmit and/or receive data and processes the data or packets that haw been received from the bus 206. The processing at the communication unit may include generating a frame from the data and/or calculating and adding of abnormal diagnostic data such as CRC. A communication unit may be configured to transfer a received packet to the communication redundancy control unit 533 on reception. While two communication units (e.g., communication units 534a and 534b) are shown in FIG. 5, three or more communication units may be included in a control device 120. The communication unit may be implemented by one or more of applications running on the CPU 201, the communication control IC 202, and the PHY 203.

Figure 6:
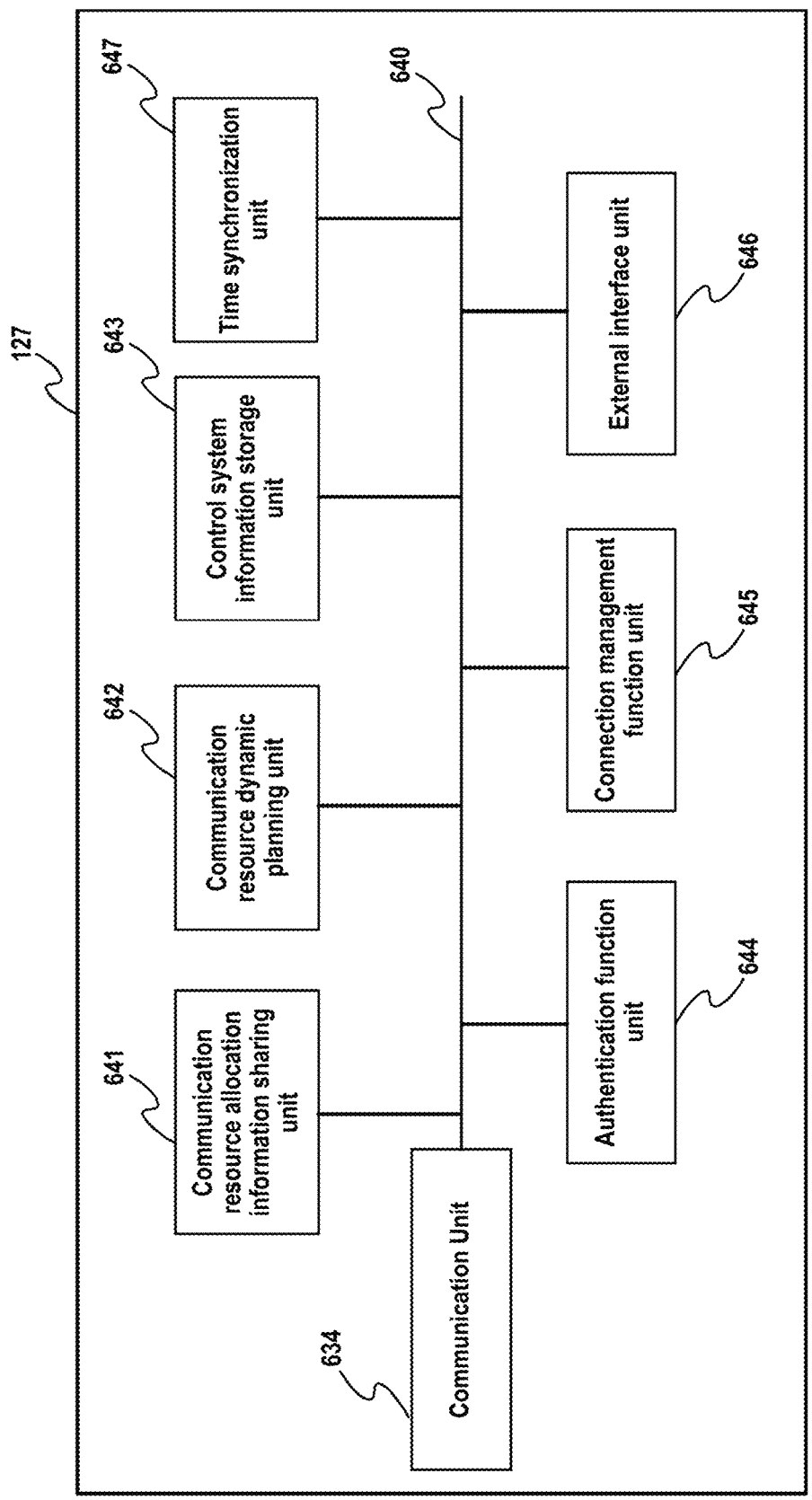
FIG. 6 illustrates the functional structure of the communication control device, in accordance with an example implementation.

FIG. 6 illustrates the functional structure of the communication control device 127, in accordance with an example implementation. A service-based interface 640, in some aspects, may be a communication interface for communication and cooperation between functions shown in FIG. 6. The service-based interlace 640, in some aspects, may be a physical communication means or a logical communication means. The logical communication means, in some aspects, involves one or more of a REST API, a HTTP, a HTTP/2, a RPC (Remote Procedure Call), a SOAP, and/or web technologies such as OpenAPI. The service-based interface 640 may be implemented by one or more of the bus 206, the control network 122, a software level communication method (e.g. inter-process communication, socket interface) between applications running on CPU 201.

Communication resource allocation information sharing unit 641, in some aspects, may share information about communication resources allocated for a communication object (e.g., an identifier) that corresponds to a communication path, with other communication resource allocation information sharing unit 641 on other communication control devices 127. Communication resource dynamic planning unit 642, in some aspects, may be configured to allocate various resources related to a control device, a set of network relay devices, a control network, a wireless base station, and/or a set of user plane functions for communication between a control device and a terminal device. The resources, in some aspects, may involve communication paths from a terminal device to a control device. A communication path, in some aspects, may be configured based on route control for the control network (e.g., for one or more network relay devices or user plane functions in the control network), a terminal device, and/or a wireless base station if they have route control function for packets. Such route control may be configured by defining a routing rule of a routing table in a router-compatible device, defining a packet forwarding rule for an Openflow™ controller, and/or specifying a destination port in VLAN. Communication resource allocation information sharing unit 641 may be implemented by one or more of the CPU 201, applications running on CPU 201 (including a software container), communication control IC 202, memory 204, and/or nonvolatile storage medium 205.

In some aspects, communication resource dynamic planning unit 642 may be further configured to allocate various computer resources in one or more of the control device, the set of network relay devices, the terminal device, the wireless base station, and/or the set of user plane functions, and communication resources in a control network and a wireless network. The computer resources may involve the number of assigned processors in a multicore processor, a scheduling priority for software operating the communication processing, an allocation time of a processor for software operation, an allocated storage capacity of SSD, HDD, and RAM, and/or a communication priority and allocated bandwidth in the bus 206. The communication resources in the control network and wireless network may involve an allocated communication bandwidth, a priority for the communication, and/or timeslots (e.g., timeslots defined in IEEE 802.1Qbv (TSN)). SMF (Session Management Function) of the 5G system can be involved as the implementation of communication resource dynamic planning unit 642. Communication resource dynamic planning unit 642 may be implemented by one or more of the CPU 201, applications running on CPU 201 (including a software container), communication control IC 202, memory 204, and/or nonvolatile storage medium 205.

The communication control device, in some aspects, may include a communication unit 634 for communicating with a terminal device or control device. Control system information storage unit 643 stores information on the control system shown in FIG. 1 and one or more terminal devices (e.g., the terminal devices 123a and 123b). Such information, in some aspects, may include information of a plurality of communication object identifiers in each of a set of terminal devices, information required to communicate with the set of terminal devices (e.g., an IP address and MAC address for each communication object associated with a terminal device). The information stored in control system information storage unit 643, in some aspects, may include information regarding a mobility of each terminal device in the set of terminal devices (whether each terminal device is mobile or not), information about sensors and actuators associated with each terminal device, information about a computational power of each terminal device, information regarding a communication ability (e.g., which protocols may be used, a latency, or a bandwidth), an operational status (e.g., an On/Off state, a standby mode of operation, etc.) of each terminal device (or communication unit of the terminal device), an operation schedule, and so on.

In some aspects, the control system information storage unit 643, may additionally store information regarding one or more of a set of control devices, the set of network relay device, the control network, the wireless base station, the set of user plane functions. The stored information may include the performance of the computer resources, communication performance, network topology, and so on. In some aspects, the information may include an identifier required for communication (IP address, etc.) and parameters related to communication settings for one or more of the components of the control network, an installed position and coverage area of the wireless base station. The information, in some aspects, may include physical information regarding the environment in which the terminal device operates (e.g., width and length of a passage, and layout information in a plant, etc.). Control system information storage unit 643 may be configured as a database such as a relational database. Control system information storage unit 643 may be implemented by one or more of the CPU 201, applications running on CPU 201 (including a software container), communication control IC 202, memory 204, and/or nonvolatile storage medium 205.

Authentication function unit 644, in some aspects, may authorize a terminal device or a communication object in a terminal device based on the authentication information. The authorization of the terminal device or the communication object in the terminal device may enable the communication control device 127 to allocate and/or assign communication resources in the system shown in FIG. 1. The authentication function unit 644 may be implemented as an AUSF (Authentication Server Function) of a 5G system. Authentication function unit 644 may be implemented by one or more of the CPU 201, applications running on CPU 201 (including a software container), communication control IC 202, memory 204, and/or nonvolatile storage medium 205.

Connection management function unit 645, in some aspects, may execute the registration, connection management, and mobility management (including handover processing) of a terminal device or a communication object in the terminal device. In some aspects, the connection management function unit 645 may be implemented as an AMF (Access and Mobility Management Function) of the 5G system. Connection management function unit 645 may be implemented by one or more of the CPU 201, applications running on CPU 201 (including a software container), communication control IC 202, memory 204, and/or nonvolatile storage medium 205.

External interface unit 646 may be an access interface of the functions of the communication control device 127 from external devices. The external interface unit 646 may provide a means to receive requests for the functions shown in FIG. 6 from allowed external devices and software. For example, the external interface 646 may receive input from a user terminal and provide data to the user terminal for display to a user via a display of the user terminal. In some aspects, the external interface unit 646 may be implemented as a NEF (Network Exposure Function) of the 5G system. External interface unit 646 may be implemented by one or more of the CPU 201, applications running on CPU 201 (including a software container), communication control IC 202, memory 204, and/or nonvolatile storage medium 205. A time synchronization unit 647 may be configured to provide a synchronization time.

While the communication control device 127 it FIG. 6 contains each function described above, in some aspects, the functions may be deployed over a plurality of communication control devices. The distributed functions may be linked through the service-based interface 640 or the control network. Examples of the communication control device 127 may include the communication control devices 127a and 127b in FIG. 1.

In some aspects, communication control device 127 may include a NRF (Network Repository Function) to discover a target function from the functions depicted in FIG. 6 and to notify an object that issues a query (e.g., Connection management function unit 645) for the target function of the target function (e.g., authentication function trait 644). The communication control device 127 may include a NSSF (Network Slice Selection Function) to manage and select a network slice which is a logical network configuration to realize the required service. In some aspects, the communication control device 127 may include one or more of a NWDAF (network Data Analytics function) to provide analysis to the network, a PCF (Policy Control Function) to maintain and manage policies rules, and/or a UDR (User Data Repository) to provide data storage capability for other functions.

Further, an NEF implementing external interface unit 646 may disclose a setting of, or information about, one or more of the communication resource allocation information sharing unit 641, the communication resource dynamic planning unit 642, the control system information storage unit 643, the authentication function unit 644, and/or the connection management function unit 645 regarding the present invention outside. External interface unit 646, in some aspects, may allow an outside object to configure the function based on received requests as well.

The configuration may involve acquiring information regarding a pair of communication objects associated with a same terminal device, acquiring information regarding a configured communication session with at least one of the pair of communication objects, and setting parameters related to the planning of communication sessions. Functions shown in FIG. 6 and related functions may be generated for each communication object and/or communication session, or one function may manage a plurality of communication objects and/or communication sessions. A function such as a SMF which implements communication resource dynamic planning unit 642 and an AMF which implements connection management function unit 645 may be replicated to make the function highly reliable. In some aspects, a single instance of the SMF or the AMF may process requests from a plurality of communication objects.

Figure 7:
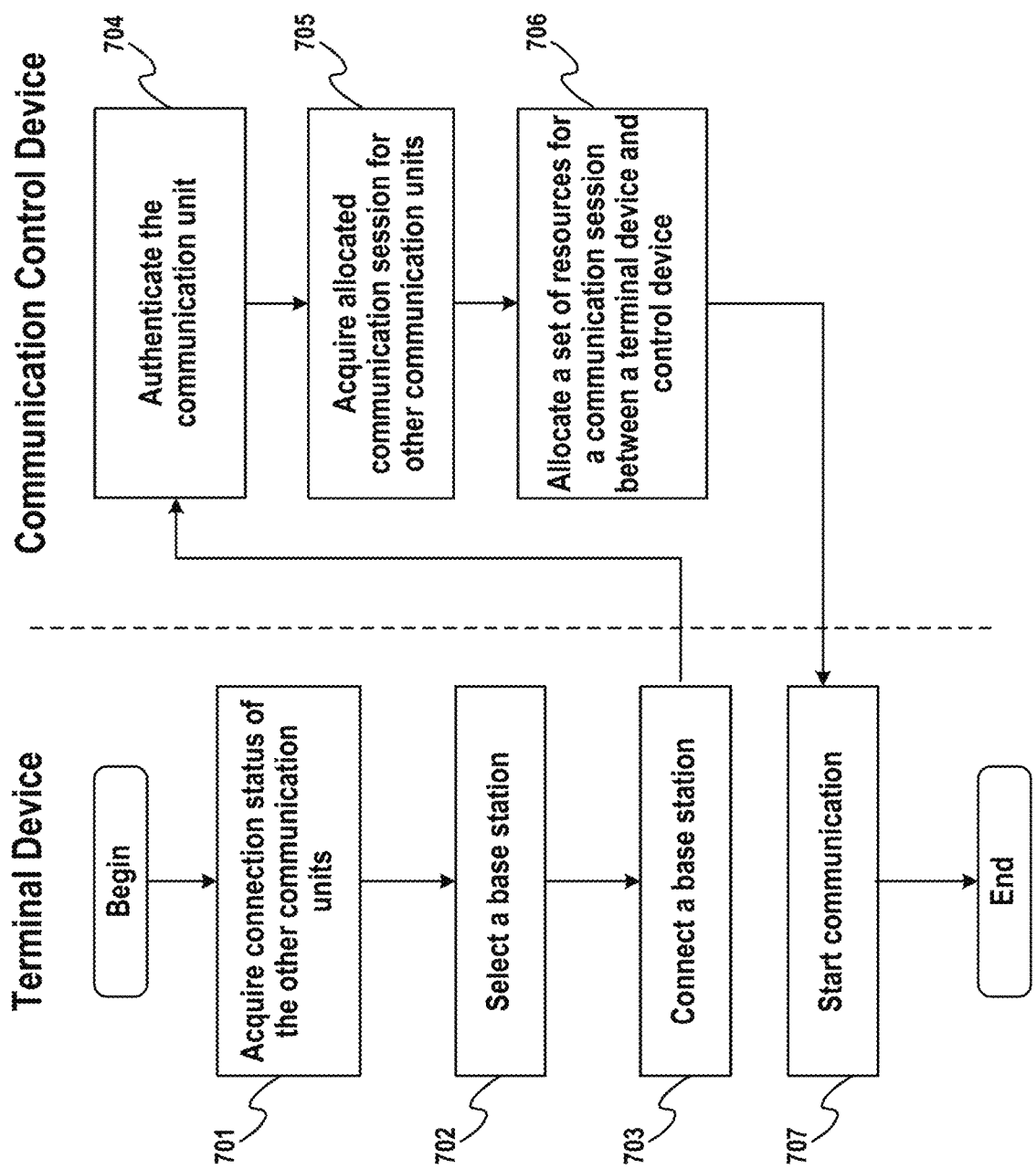
FIG. 7 illustrates a process of communication session establishment between a terminal device and a control device, in accordance with an example implementation.

FIG. 7 illustrates a process of communication session establishment between a terminal device and a control device, in accordance with an example implementation. A terminal device (e.g., terminal device 123, 123*a*, and 123*b*), or a communication unit (e.g., communication unit 434*a* or 434*b*) of a terminal device, may begin the process by acquiring, at 701, a connection status of each other communication unit (or communication object) of the terminal device. In some aspects, the connection status of each other communication unit may include an identification of a wireless base station to which the other communication unit connects.

At 702, the terminal device, or the communication unit of the terminal device, may select a wireless base station to which to connect. The selection of the wireless base station, in some aspects, may be based on the connection status of each other communication unit acquired at 701. In some aspects, the selected wireless base station may be a wireless base station that is not connected to the other communication units of the same terminal. By selecting, at 702, a wireless base station that is not connected to other communication units, the terminal device, or the communication writ of the terminal device, avoids a single point of failure at the wireless base station.

At 703, the terminal device, or the communication unit of the terminal device, may connect to the wireless base station selected at 702. Selecting the wireless base station, at 702, and connecting to the base station, at 703, may involve synchronization with announce signals transmitted from the selected wireless base station, acquisition of the identification information of the wireless base station included in the announce signals, and a cell search process including these processes.

Once the terminal device has connected to the selected wireless base station at 703, a communication control device (e.g., an authentication function unit 644 and/or a connection management function unit 645) may authenticate, at 704, a particular communication unit. Authenticating, at 704, the communication unit may include determining whether the communication is an authorized communication device by using authorization information associated with the communication unit. In some aspects, the information associated with the communication unit may be provided by a component of an associated terminal device (e.g., an authentication information management unit 431). For example, referring to FIG. 6, connection management function unit 645 may register the communication unit as an authorized device for the system including the functions shown in FIG. 6.

At 705, the communication control device (e.g., a communication resource dynamic planning unit 642) may acquire the connection status of other communication units in the same terminal device that includes the particular communication unit that connects to the wireless base station at 703. The connection status, in some aspects, may include information about a communication session and a reserved communication path. The information regarding a reserved communication path, in some aspects, includes information regarding a set of communication resources (e.g., network relay devices, user plane functions, communication links, etc.) that make up the communication path.

At 706, the communication control device (e.g., communication resource dynamic planning unit 642) may allocate a set of resources for a communication session between the particular communication unit and a control device via the wireless base station selected at 703. Allocating the set of resources for the communication session at 706 may include allocating a set of communication resources (e.g., network relay devices, user plane functions, communication links, etc.). The communication resources in the control network and wireless network may include an allocated communication bandwidth, a priority for the communication, and/or timeslots (e.g., timeslots defined in IEEE 802.1Qbv (TSN)). In some aspects, the set of resources for the communication session at 706 may include allocating a set of computer resources it one or more of the control device, the set of network relay devices, the terminal device, the wireless base station, and/or the set of user plane functions. The computer resources may involve the number of assigned processors in a multicore processor, a scheduling priority for software operating the communication processing, an allocation time of a processor for software operation, an allocated storage capacity of SSD, HDD, and RAM, and/or a communication priority and allocated bandwidth in the bus 206.

The communication control device (e.g., communication resource dynamic planning unit 642) may allocate a communication resource (e.g., a network relay device, a user plane function, and a communication link) that was not allocated for one of the other communication units associated with the same terminal device as the particular communication unit. By allocating a communication resource that was not allocated for one of the other communication units, the communication control device avoids allowing a communication resource to become a single point of failure. In some aspects, based on the allocation, the communication control device may configure the communication session. The configuration may include IP address setting, any configuration for communication based on one or more communication protocols used in the control network, configuring network slicing, a selection of the set of user plane functions, or other configuration related to the communication route. The configuration related to the communication route may include a configuration of packet forwarding rules in the set of network relay devices or the set of user plane functions included in the communication path.

After allocating the set of resources at 706, the terminal device may start a communication, at 707, with a control device. For example, referring to FIGS. 1 and 4, a terminal device 123a, or a processing unit 430 of terminal device 123, may begin a communication via, e.g., a communication unit 434a or 434b, with a control device 120a. The communication may be via the communication path allocated and configured by the communication control device 127a and/or 127b.

The process of FIG. 7 may be performed for each communication unit (or communication object) of each terminal device. Therefore, the process illustrated in FIG. 7 may be executed in parallel for a plurality of communication units initiating a communication session at a same time. Parallel execution of the process of FIG. 7, in some aspects, may result in a plurality of communication units selecting the same wireless base station because neither communication unit has established a connection with any wireless base station when acquiring, at 701, a connection status of each other communication unit. To avoid a single point of failure based on selecting a same wireless base station in parallel selection processes, in some aspects, acquiring the connection status of each other communication unit at 701 may include acquiring a set of candidate wireless base stations that each communication unit may select at 702. The selection at 702 may then be made to avoid any of the candidate wireless base stations for another communication unit (e.g., by selecting a candidate wireless base station at a first communication unit that is not a candidate wireless base station for other communication units of the same terminal device). In some aspects, the selection at 702 may be configured such that if there is more than one common candidate wireless base station, the candidate wireless base stations are placed in an ordered list and a first communication unit selects a first wireless base station in the ordered list and a second communication unit selects a second wireless base station in the ordered list.

The process of FIG. 7 may also be performed to =elect a wireless base station during a handover operation. As described above in relation to the selection at 702, during the handover process, the reselection may avoid selecting a wireless base station that is in communication with another communization unit of the same terminal device. In some aspects, the wireless base station may enforce the selection of different wireless base stations by rejecting a connection request from a communication unit when the communication unit issues the request to the wireless base station with an indication of other communication units in the same terminal device and one of the indicated communication units has established a communication session with the wireless base station. The wireless base station may then indicate to the terminal device or the communication unit to select a different wireless base station (e.g., to perform the selection at 702 again). This can guarantee that the communication units in the same terminal device do not connect with the same wireless base station.

Further, the terminal device may be configured with a position of the terminal device (e.g., for non-mobile terminal devices), or may locate its position by using GPS or SLAM (Simultaneous Localization and Mapping), and/or other position determination methods. The terminal device may store a determined or known (e.g., installed) position of the wireless base station, information related to the communication network between the wireless base station and the control device, and the selection at 702 of the wireless base station may be based on the information related to the communication network. By basing the selection on the information related to the communication network, the selection of different wireless base stations may be guaranteed and/or a communication path to the control device with a communication performance that is better than other communication paths (e.g., is associated with a shorter delay, or greater bandwidth, etc.) may be selected.

In some aspects, a number of available wireless base stations may be less than the number of communication units associated with at least one terminal device. In such situations, the process may allow multiple communication units of a terminal device to connect to a same wireless base station. In order to allow multiple communication units of a terminal device to connect to a same wireless base stations, there may be an indication received at one or more of the wireless base station and/or the terminal device that a single wireless base station may be selected by multiple communication units of a terminal device. Additionally, the use of a single wireless base station by multiple communication units of a terminal device may be indicated to a system operator or other interested parties by an external disclosure means in the terminal device, the wireless base station, a control terminal, or a user interface.

Figure 8:
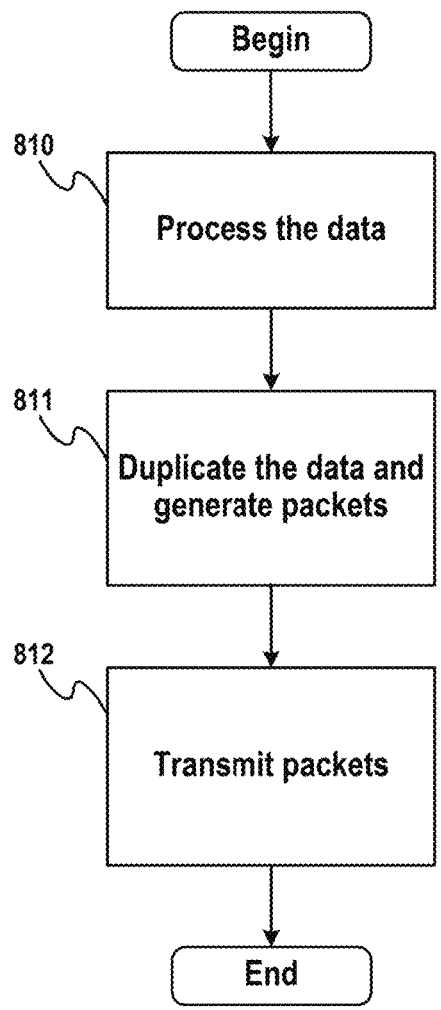
FIG. 8 illustrates a method for processing communication for transmission.

FIG. 8 illustrates a method for processing communication for transmission. The method may be performed by a terminal device (e.g., by processing unit 430, communication redundancy control unit 433, and communication unit 434a and/or 434b of terminal device 123 of FIG. 4) or a control device (e.g., by processing unit 530, communication redundancy control unit 533, and communication unit 534a and/or 534b of control device 120 of FIG. 5). In the method of FIG. 8 the terminal device or control device (e.g., a processing unit 430 of the terminal device 123 or a processing unit 530 of the control device 120), at 810, may process (or calculate) data for transmission. The processing at 810, in some aspects, may involve calculation of a control command, e.g., for transmission from a control device to a terminal device. In some aspects, the processing at 810 may include processing sensor information (e.g., a sensor value) obtained from sensors of the terminal device, e.g., for transmission from the terminal device to the control device.

At 811, the terminal device or the control device (e.g., a communication redundancy control unit 433 or 533) may duplicate the data for inclusion in a number of packets that may be the same as the number of redundant communication paths. For example, fora first communication to a control device or a terminal device, the terminal device or the control device, respectively, may be configured to generate first and second duplicate packets for transmission viii each of a first set of resources and a second set of resources (e.g., a first and second communication paths). The process may also generate, at 811, packets including the duplicated data for transmission. In some aspects, a header or a tag for each packet may be generated and appended to the generated packets. The header or tag may store one or more of an identifier of the communication unit (e.g., communication unit 434a and/or 434b or 534a and/or 534b) that transmits the corresponding packet, a sequence number associated with the generated packets (e.g., a sequence number incremented for each transmission that is the same for each communication path). The sequence number may be incremented during the processing of the data at 810 to be duplicated and included in the generated packets at 811.

Finally, at 812, the terminal device or the control device may transmit the packets generated at 811. In some aspects, the packets generated at 811 are transmitted by corresponding communication units (e.g., communication units 434*a* and or 434*b* or 534*a* and/or 534*b*). For example, a first and second duplicate packet may be transmitted to a control device or a terminal device via different communication paths. The transmission of the duplicated data from each of the communication units may increase the reachability of the packets to a terminal device or a control device.

Figure 9:
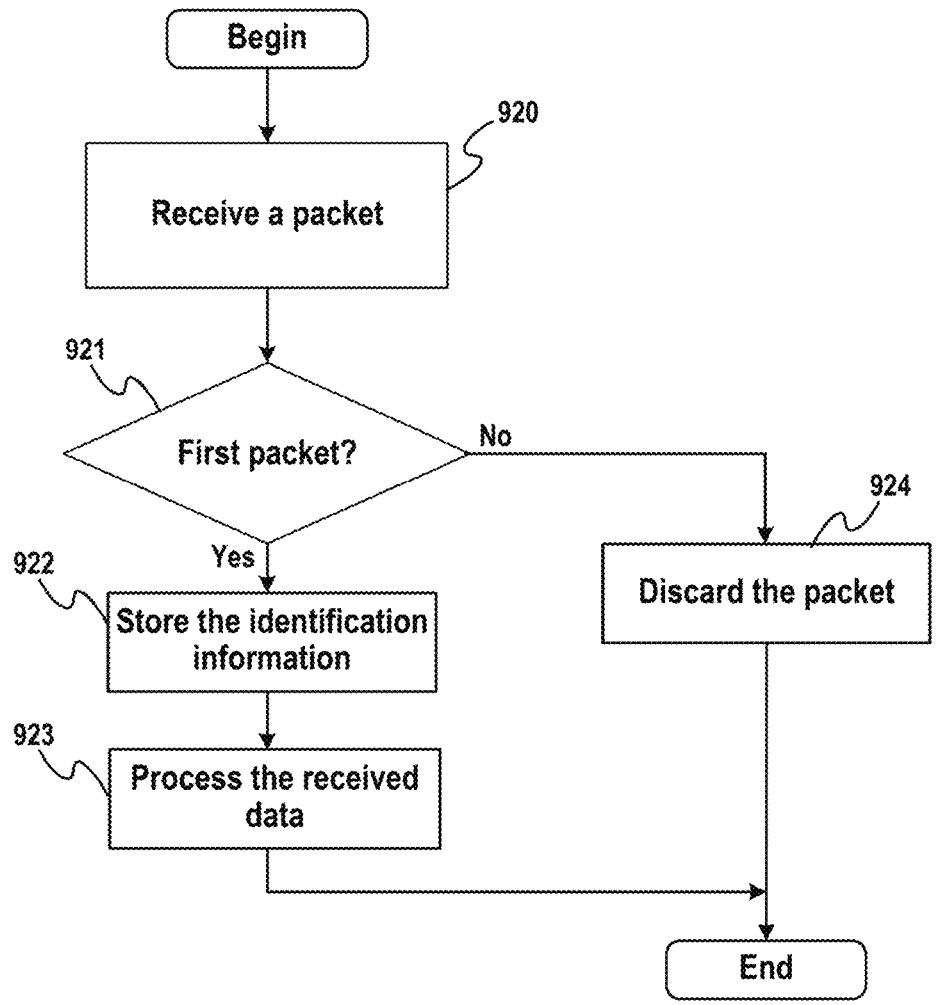
FIG. 9 illustrates a method fox processing communication produced via the method of FIG. 8 and received at a terminal device or a control device.

FIG. 9 illustrates a method for processing communication produced via the method of FIG. 8 and received at a terminal device or a control device. The method of FIG. 9 may be performed by a terminal device or a control device (e.g., a communication redundancy control unit 433 or 533). The terminal device or the control device may receive a packet at 920, e.g., at a communication unit of the terminal device or the control device.

At 921, the terminal device or the control device may determine whether the packet received at 920 is a fast copy of a packet received at the terminal device or the control device (e.g., fast-crane data) or is a duplicate of a previously-received packet. In some aspects, the determination at 921 may be determined based on equality checking by comparing parameters on the packet header or tag. If the equality checking returns a result indicating that parameters associated with the packet received at 920 are equal to parameters associated with a previously-received packet, the packet may be determined to not be a first copy of the packet and the packet may be discarded at 924. For example, packets that have the same sequence number and source identifier (e.g., IEEE 802.3 MAC address) are determined to belong to the same communication.

If the equality checking returns a result indicating that parameters associated with the packet received at 920 are not equal to parameters associated with a previously-received packet, the packet may be determined to be a first copy of the packet. If the packet received at 920 is determined at 921 to be a first copy of the packet, the terminal device or the control device may store, at 922, identification information that may be used to identify subsequently received duplicate packets. The identification information may include the parameters on the packet header or tag that are used for the equality checking (an n-tuple identifying a source and/or destination of the packet, a sequence number associated with the packet, or other identifying information). In some aspects, the identification information may be removed after a certain period. Removing the identification information, in some aspects, may prevent an incorrect determination caused by round-up of the sequence number. For example, if a bit width of the sequence number is 8, the sequence number may return to 0 after 236 transmissions and the time period before removal may be configured to remove the identification information before 256 transmissions are received as part of a particular communication session.

In addition to storing the identification information at 922, the terminal device or the control device may process, at 923, the data included in the received fast copy of the packet. Processing the data included in the received first copy of the packet at 923, for example, may include, for a control device, calculating a control command value based on received sensor data in the first copy of the packet. Processing the data included in the received first copy of the packet at 923, for example, may include, for a terminal device, calculating an output (e.g., an output for instructing (driving) an actuator to take a particular action). For example, for a first communication from a terminal device (or a control device), the control device (or the terminal device) may be configured to (1) process a first-received packet of a first and second duplicate packet generated by the terminal device (or a control device) and (2) discard, a second-received packet of the first and second duplicate packets based on identifying the second-received packet as a duplicate of the first-received packet.

Figure 10:
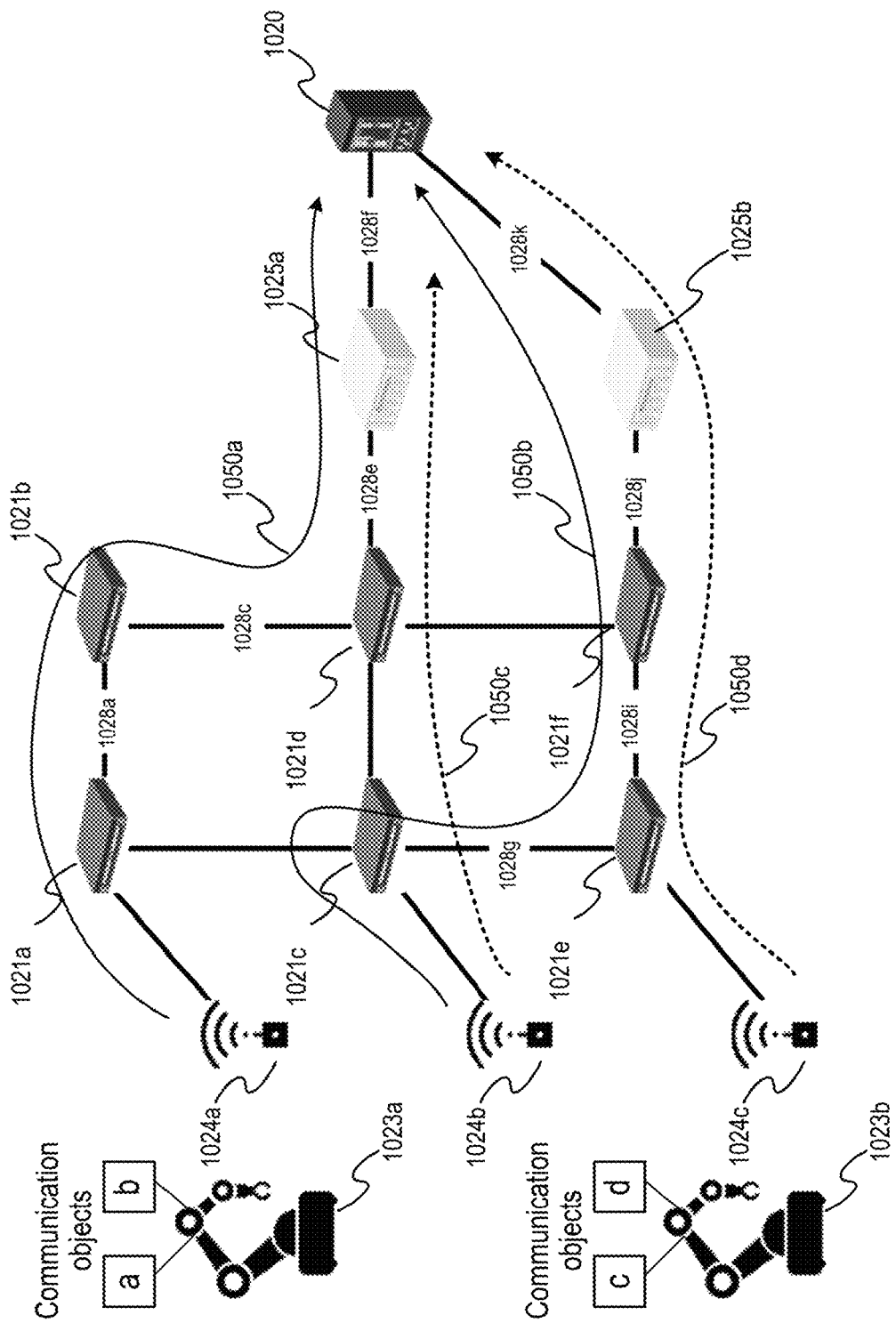
FIG. 10 illustrates a first and second communication path allocated for each communication object of each of a first terminal device and a second terminal device.

FIG. 10 illustrates a first and second communication path allocated for each communication object of each of a first terminal device 1023*a* and a second terminal device 1023*b*. For example, based on the position of terminal device 1023*a*, the communication objects 'a' and 'b' associated with terminal device 1023*a* may establish communication sessions with wireless base stations 1024*a* and 1024*b*, respectively (e.g., based on the selection at 702. Similarly, based on the position of terminal device 1023*b*, the communication objects 'c' and 'd' associated with terminal device 1023*b* may establish communication sessions with wireless base stations 1024*b* and 1024*c*. In addition to each communication object establishing a communication session with a different base station from other communication objects in a same terminal device, the communication path (e.g., communication paths 1050*a*-1050*d*) associated with (or allocated to) each communication object connecting to a control device 1020 may include disjoint sets of resources so as to avoid a single point of failure.

In some aspects, if a terminal device changes a position, a reallocation of resources including a wireless base station may be performed based on the new position. The reallocation, in some aspects, is part of a handover process, in which a first communication session is maintained while a second communication session is terminated and reestablished with a different base station. The handover process may ensure that the terminal device maintains at least one communication session with the control device even as the terminal device changes position or must reestablish communication with a base station for some other reason. For example, if terminal device 1023*a* were to move to a similar position to terminal device 1023*b*, the communication session with wireless base station 1024*a* may be terminated, while the communication session with wireless base station 1024*b* is maintained and a new communication session with wireless base station 1024*c* may be established in place of the communication session with wireless base station 1024*a*.

FIG. 10 will be used here to describe various aspects of the operation of the planning apparatus and the control network. In some aspects, the communication object 'a' connects with the wireless base station 1024*a*, then requests the establishment of a communication session with the control device 1020 from a communication control device, and the communication object 'b' connects with the wireless base station 1024*b*, then requests the establishment of a communication session with the control device 1020 from a communication control device.

As described in relation to FIG. 7, the communication object 'a' and communication object 'b' may connect with different wireless base stations. A communication resource dynamic planning unit (e.g., communication resource dynamic planning unit 642 of FIG. 6) in the communication control device may reserve a first communication path as a part of a communication session for communication object 'a'. The first communication path may include a reserved route including a first set of communication devices and communication links including network relay devices 1021*a*, 1021*b*, 1021*d*; user plane function 1025*a*; and communication links 1028*a*, 1028*c*, 1028*e*, and 1028*f*. Then, the communication resource dynamic planning unit may establish the communication route by configuring the configuration such as forwarding port for packets between the communication object 'a' and the control device 1020, for network relay devices 1021a and 1021b, and user plane function 1025a in accordance with the mute planning information.

A communication resource dynamic planning unit in the same, or a different, communication control device may reserve a communication path as a communication session for the communication object 'b'. The communication resource dynamic planning unit may recognize that the terminal device 1023a is equipped. (or associated) with the communication object 'a' in addition to the communication object 'b' according to the control system information storage unit (e.g., control system information storage unit 643 of FIG. 6). Then, the communication resource dynamic planning unit may acquire e.g., at 705 of FIG. 7, the resources reserved for the communication object 'a' according to the communication resource allocation information sharing unit (e.g., communication resource allocation information sharing unit 641 of FIG. 6). The communication resource allocation information sharing unit in the communication control device may communicate with the communication resource allocation information sharing unit in the communication control device that reserved (allocated) the communication path for communication object 'a', and obtains the reserved route including the first communication devices and communication links for the communication object 'a' by the communication resource dynamic planning unit.

The communication resource dynamic planning unit, in some aspects, plans a route via communication devices and communication links in the control network that does not overlap with the reserved route (e.g., the first set of communication devices and communication links) for the communication object 'a' based on the acquired information. Then, for example, the communication resource dynamic planning unit plans a route including a second set of communication devices and communication links that is disjoint from the first set of communication devices and communication links. The second set of communication devices and communication links may include network relay devices 1021c, 1021e, 1021f; user plane function 1025b; and communication links 1028g, 1028i, 1028j, and 1028k, by selecting a disjoint set of communication devices and communication links the reliability is improved by removing a single point of failure of communication devices and communication links that may exist if the set of communication devices and communization links for the first communication object and the second communication object could overlap.

In some aspects, establishment of communication sessions for the communication object 'a' and 'b' may start close in time, and the communication object 'a' obtains the reserved resource for the communication object 'b' when the communication object 'a' requests the establishment of communication session, and vice versa. In some aspects, when the establishment of a communication session completes before the establishment of a different communication session completes, the same communication devices and communication limos may be reserved unexpectedly. To avoid such situation, reserved information about a communication session may be shared between communication resource dynamic planning units of different communication control devices or between separate functions of a single communication control device reserving resources for different communication objects of a same terminal device by communication resource allocation information sharing units after establishment of a communication session.

If the same communication devices and communication links are reserved on the communication mutes, one of the reservations of communication session can be canceled and may establish the communication session again. Which communication session to cancel and reestablish (or reallocate) may be determined based on the priority defined for different communication resource dynamic planning units of different communication control devices in advance. In some aspects, the communication session established later may be determined as the communication to be canceled and reestablished.

In some aspects, the communication session to be reestablished may be determined based on the performance comparison of the reserved routes (e.g., the set of communication devices and communication links in the reserved routes) for the two communication sessions. For example, a session that has broader communication bandwidth, shorter communication delay, or higher performance of the computer resources may be selected to remain, and the other session may be reestablished (or retried). In some aspects, a communication session where the number of alternative communication paths is larger can be selected to be canceled for the communication control device to retry the establishment of the session. In some aspects, a communication resource dynamic planning unit may wait for completion of another establishment of communication session, then retry to establish the communication session after that.

A communication resource dynamic planning unit of a first communication control device may notify the communication resource dynamic planning units of other communication control devices of the occurrence of the configuration request of a communication session at the time of the reception of the request. The communication resource dynamic planning units of other communication control devices may pause a session establishment operation until being notified of the reserved resources. If there are multiple communication resource dynamic planning units that have paused a resource planning operation, a communication resource dynamic planning unit to resume the session establishment may be selected based on the priority among the communication resource dynamic planning units where the priority is determined in advance or based on an order of received requests.

The communication path in the control network planned by communication resource dynamic planning unit should meet the condition that is not overlapped with the other communication paths reserved for the other communication objects in the same terminal device. Such planning of the communication path may be based on a searching method. When multiple communication paths are detected, the paths may be prioritized based on a set of criteria. Such criteria may involve a communication delay, the number of hops (e.g., the number of network relay devices and user plane function), a communication bandwidth, the number of used protocol layers in the route of the communication path, the performance of the computational resources in the network relay devices and/or user plane functions in the communication path, a reliability of the network relay devices and/or user plane functions, and/or a processing load of the hardware and/or software in the network relay devices and/or the user plane functions in the communication path.

In the case of communication delay or communication bandwidth, a path may be selected based on statistics such as the minimum value, average, maximum value, deviation. For example, some cases prefer a path that has lower deviation (jitter) than a path that shorter communication delay due to the control system characteristic. The number of used protocol layers in the mute of the communication path refers to the sum value of communication protocol layers to be configured in the communication path setting. For example, the value is two when a path is configured by VLAN and UPF because the two layers, link layer and application layer, are used. The criteria associated with a time period such as computation load can be total value from initiation or the value during a specified time. Alternatively, a specified term in a cyclic period can be used (e.g. the term during 14:00-16:00 in a day). The selection of the term can be based on the current time. If the current time is 14:30, the value during 14:00-16:00 can be used as the criteria. The priority may be the combination of the above-mentioned determination method. As an example, the sum of the value for each criterion multiplied by a predetermined weighting coefficient may be used to order the multiple communication paths for selecting a path with a highest (or lowest) score or place in the ordered list. Reservation of the communication session planned by communication resource dynamic planning unit can be executed dynamically upon reception of the request from a communication object in a terminal device.

In some aspects, a communication resource dynamic planning unit may prepare (or identify) a set of communication paths that do not have a single point of failure on the communication paths before the operation of the control, system. The communication resource dynamic planning unit may prepare multiple sets of communication paths that do not have a single point of failure on the communication paths for each of multiple combinations of wireless base stations. Upon receipt of a request from a communication object, the communication resource dynamic planning unit may select a communication path from a set of communication paths and assign the resources associated with the communication path for the requesting communication object.

For example, a set of communication paths Including communication paths 1050a and 1050b and a set of communication paths including communication paths 1050c and 1050d may be prepared in advance. The selection of the sets of communication paths and a selected path may be determined by the combination of wireless base stations with which communication objects in a terminal device connect and/or a communication object in the terminal device requesting a communication path. For example, if the communication object 'a' in the terminal device 1023a connects with wireless base station 1024b and requests to establish a communication session to communication resource dynamic planning unit.

The communication resource dynamic planning unit may determine that wireless base station 1024a and 1024c are located near wireless base station 1024b, and the terminal device 1023a has the communication object 'a' and 'b' according to control system information storage unit, the communication resource dynamic planning unit 642 determine that the communication object 'b' may connect with wireless base station 1024a or 1024c. Based on the determination, the communication resource dynamic planning unit, for example, reserves the communication path 1050b for the communication object 'a'. When the communication object 'b' connects with wireless base station 1024a and requests the establishment of a communication session to communication resource dynamic planning unit, the communication resource dynamic planning unit may assign the communication path 1050a to the communication object 'b' which is one of the communication paths in a set of communication paths associated with the terminal device 1023a or the combination of wireless base stations 1024a and 1024b.

If the communication object 'b' connects with wireless base station 1024c and requests the establishment of a communication session to communication resource dynamic planning unit, the communication resource dynamic planning unit may not establish a communication path for communication object 'b' because there is no communication path including wireless base station 1024c that does not overlap with the communication path 1050b. Accordingly, the communication resource dynamic planning unit may change the set of the communication paths (e.g., from a set of communication paths associated with the combination of wireless base stations 1024a and 1024b to a set of communication paths associated with the combination of wireless base stations 1024b and 1024c). The communication resource dynamic planning unit may then reestablish for re-reserve), for communication object 'a', a communication session with a different communication path, e.g., communication path 1050c that allows the non-overlapping communication path 1050d to be reserved for the communication object 'b'. By using prepared sets of communication paths that include non-overlapping communication paths may be advantageous not only to reserve communication paths without a single point of failure but also to shorten the planning time of communication sessions since it does not require dynamic planning of communication paths.

The establishment of a communication path for the terminal device 1023b may be the same. The communication paths for the communication object 'c' and 'd' may be prepared or identified so as to not overlap with each other but may overlap with communication paths for communication objects 'a' and/or 'b' in the terminal device 1023a. For example, when the communication object 'c' connects with wireless base station 1024c and requests the establishment of a communication session to communication resource dynamic planning unit, the communication resource dynamic planning unit may assign the communication path 1050d for the communication object 'c', then, when the communication object 'd' connects with wireless base station 1024b and requests the establishment of a communication session to communication resource dynamic planning unit, the communication resource dynamic planning unit may assign the communication path 1050c for the communication object 'd'.

In some aspects, communication resource dynamic planning unit may plan a communication path in accordance with a wireless base station predicted to be a wireless base station with which a communication object of a terminal device will establish a communication session. The prediction, in some aspects, may be based on dynamic characteristics of the terminal device such as a current position, a moving direction, a moving speed, and/or an acceleration that may be used to estimate and/or predict the target position of a terminal device in the future. For example, if the terminal device 1023b in FIG. 10 connects with wireless base station 1024b and 1024c, and is going upward in FIG. 10, the terminal device 1023b is predicted to connect with wireless base station 1024a, so that a communication resource dynamic planning unit can plan a communication path in advance.

The predicted wireless base station(s) may be the wireless base station(s) with coverage areas including the predicted position of the terminal device. The dynamic characteristic(s) of the terminal device may be transferred from the terminal device to a control system information storage unit (e.g., control system information storage unit 643 of FIG. 6) by a communication means between the terminal device and the control system information storage unit. In some aspects, a communication resource dynamic planning unit may estimate the movement or predict a future communication of a terminal device based on the history of wireless base stations with which the terminal device connected in the past and location information of the wireless base stations. The information may be obtained from a control system information storage unit.

A prediction, in some aspects, may be used to decide whether communication sessions are configured or a configuration timing of a communication session. The configuration, or the configuration timing, may be based on sharing the prediction between a communication resource dynamic planning unit and a control system information storage unit in a communication control device. For example, Assuming the terminal device 1023b is moving upward in the FIG. 10, it is predicted that the connected wireless base station will change from 1024c to 1024a, and keep the connection with 1024b. Based on the prediction, a communication resource dynamic planning unit that manages the communication session passing through the wireless base station 1024c may start planning to update the communication path to change to a communication path through the wireless base station 1024a.

In some aspects, the communication resource dynamic planning unit that manages the communication session passing through the wireless base station 1024b may keep the communication session including the communication path. However, if the communication path 1050c and 1050d are used in communication sessions with the communication objects 'c' and 'd' of terminal device 1023b before the update to the communication sessions, the updated communication path, e.g., communication path 1050a may not be non-overlapping with the communication path 1050c associated with wireless base station 1024b. The communication resource dynamic planning unit, in some aspects, may maintain the communication path 1050c until the communication path 1050a is established and then update the communication path associated with the wireless base station 1024b to the communication path 1050b which is non-overlapping with communication path 1050a. By maintaining the communication path 1050c until communication path 1050a is established they system may avoid "dead time" in which no communication path is available.

In order to synchronize with each other to ensure proper timing one or more of the control devices, the network relay devices, the terminal devices, the wireless base stations, the user plane function, and the communication control devices may have a time synchronization means. The synchronization may facilitate planning and execution of plans that requires temporal information such as current time and velocity. The time synchronization means can involve IEEE 1588, IEEE 802.1AS, NTP, SNIP, and so on.

In some aspects, a communication resource dynamic planning unit may plan communication paths for different communication objects of a same terminal device to cause a difference of communication delay. The communication resource dynamic planning unit, in some aspects, may plan communication paths for different communication objects of a same terminal device between with different numbers of communication devices (e.g., numbers of hops). By doing this, the arrival time of one (redundant) packet at a control device may be shifted relative to a different (primary or first) packet so that a load of processing the multiple received packets at the control device can be balanced. Balancing the bad at the control device may improve communication reliability by reducing the possibility of packet loss in the control device due to processing overload.

In some aspects, a connected wireless base station and communication paths for a terminal device may be determined based on regularly occurring events in the target system. For example, carrying in of goods by truck at a specified time in a factory, scheduled AGV and AMR may affect a radio environment, so that a wireless base station may be selected based on the planned or regularly occurring events. For example, when a terminal device selects a wireless base station, a communication resource dynamic planning unit may notify the terminal device of the event information and related wireless base station, so that a communication object in the terminal device selects a wireless base station based on the information. In some aspects, the communication object may be configured to select the indicated wireless base station at a future time associated with the regularly occurring, or planned, event.

Communication sessions, in some aspects, may be changed and reassigned according to changes in the system. Such changes may involve (1) a handover due to movement of terminal device, (2) a relocation of a virtual machine or software container associated with a user plane function and/or functions of the communication control device are implemented as a software object, and/or (3) failure of communication devices composing the communication session.

Figure 11:
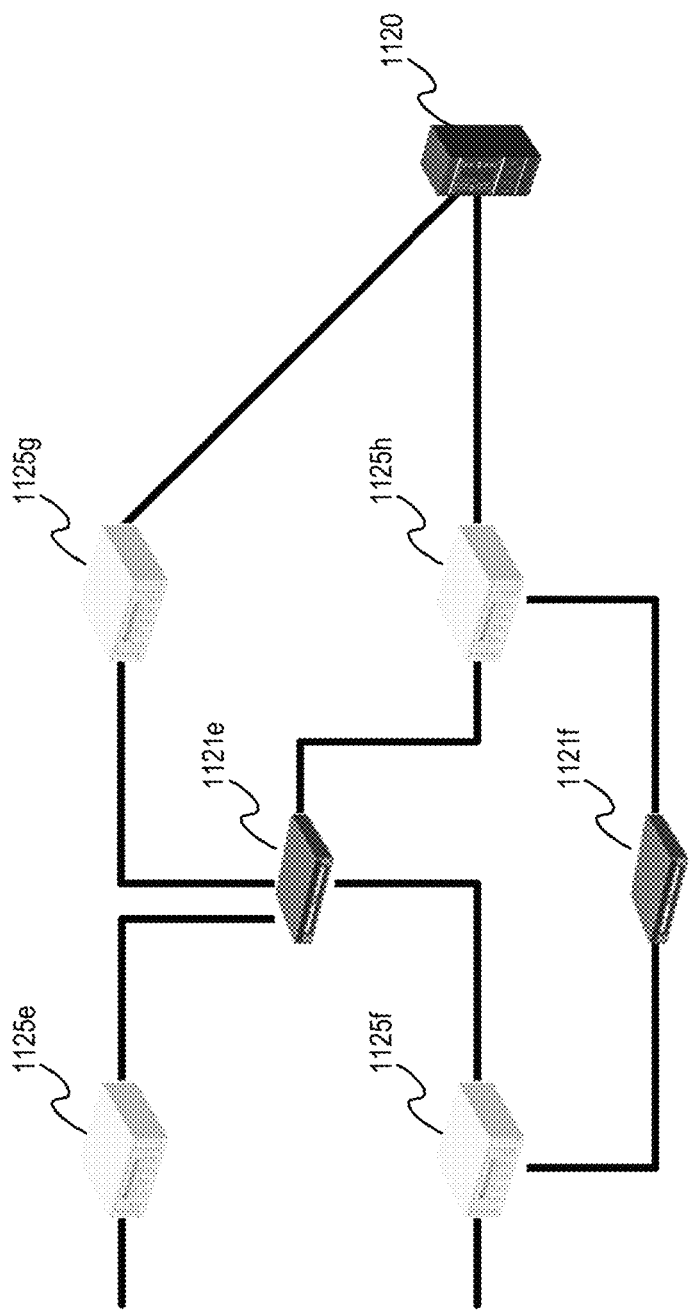
FIG. 11 illustrates an example portion of a control network that may be used for communication between communication objects 'a' and 'b' of a terminal device (not shown) and a control device.

Communization devices composing the control network may include network relay devices or user plane functions. User plane functions and control devices are neighbored in the structure shown in FIG. 1, but user plane function may, in some aspects, take a hierarchical structure as shown in FIG. 11. The protocol layer forwarding packets in the user plane function, in some aspects, may be the application layer of the Internet protocol stack, packet forwarding in IEEE 802.3 such as IEEE 802.1CB, IEEE 802.1Qca, IEEE 802.1Qcc, and VLAN is link layer of the internet protocol stack, and packet forwarding in IP is internet layer of the protocol stack.

FIG. 11 illustrates an example portion of a control network that may be used for communication between communication objects 'a' and 'b' of a terminal device (not shown) and a control device 1120. In the example shown in FIG. 11, if communication from the communication object 'a' includes the user plane function 1125e and 1125g and communication from the communication object 'b' includes the user plane function 1125f and 1125h. If packets in the communication session of the communication object 'b' are forwarded to the network relay device 1121e after being received at the user plane function 1125f and packets in the communication session of the communication object 'a' are forwarded to the network relay device 1121e after being received at the user plane function 1125e, the user One function 1125e is overlapped on the communication path. To avoid this, the user plane functions 1125f (and 1125h) may be configured with a route in the link layer to forward packets of the communication session from the communication object 'b' (or from the control device 1120 for user plane function 1125h) to the network relay device 1121f. In general, setting the communication path in the lower protocol layer may avoid the possibility of the overlap of communication paths in the upper protocol layer. If there is no possibilty of overlap of communication paths in the lower protocol layer, the configuration for the upper protocol may be sufficient and no setting of the communication path in the lower keel may be performed.

In some aspects, the protocols used for the configuration of communication sessions by a communication resource dynamic planning unit may involve one or more of NET- CONF, OpenFlow™, YANG (Yet Another Next Generation), SNMP (Simple Network Management Protocol), OVSDB (Open vSwitch Database Management Protocol), IEEE 802.1CB, IEEE 802.1Qca, IEEE 802.1Qcc, and/or IEEE 802.1Q. Net slicing may be an example, in some aspects, of a means for managing configuration of a communication session as a net slice.

When a same network relay device, user plane function, and/or communication link are detected to be used in communication sessions in planning of communication sessions by a communication resource dynamic planning unit, information regarding the overlapped communication devices or communication leaks may be exposed (presented) to system operators by presentation means such as a display presenting a user interface for controlling or monitoring the system. Based on the presented information, the operator can identify communication devices or communication links as potential bottlenecks or single points of failure and the location of the communication devices or communication links in the control network. In some aspects, the system may present one or more candidate positions of an additional communication device and/or communication path to avoid the single point of failure.

The candidate positions may be searched by a searching method. This allows the operators to redesign the position of a wireless base station or to redesign the network topology of the control network. Presenting the information regarding the single points of failure and one or more candidate positions, in some aspects, may allow a system operator to improve the reliability of the control system. In some aspects, the overlapped communication devices and communication links may be prioritized based on a predetermined rule, and a communication path may be selected so as to get higher priority in the planning of a communication session. The predetermined rule, in some aspects, may be the same as the criteria for priority when a plurality of paths is found in the planning of communication sessions by a communication resource dynamic planning unit.

In some aspects, the system may warn system operators to improve the system configuration in accordance with the experience of the redundant communication. For example, when communication reachability of any of the existing communication sessions can be determined to be low (e.g., below a threshold reachability) according to a received history of the redundant communication in a control device or in a communication object of a terminal device, the communication control device may present a warning indicating the low reachability to one or more system operators. Based on the warning, the one or more system operators may take measures such as changing an installed position of one or more wireless base stations, improving radio wave communication performance, changing the network topology of the control network, and/or improving a communication performance nee of communication devices, so that the reliability of the overall system can be improved.

In some aspects, additional information regarding environmental factors leading to performance degradation may be acquired by the planning apparatus and presented to the one or more system operators. For example, a degradation of radio wave communication may occur each time a truck carrying goods arrives in an area associated with one or more base stations connected to the control network. The planning apparatus may receive information indicating that the radio wave communication degradation and the arrival of the truck are associated. Based on the information regarding the association between the arrival of the truck and the radio wave degradation, the planning apparatus may present an option to move a particular base station that is affected by the truck or to have a planned handover to an unaffected base station when detecting the truck at a certain distance from the affected base station. The one or more system operators may then determine whether to implement one of the presented options or take another action (e.g., no action, or an option not presented by the planning apparatus such as changing a path for the truck or a delivery location). act on the presented option. associated environment (e.g. carrying in goods by truck in a factory) in the system can be identified based on the information, so that operators can take necessary measures such as changing installed position of wireless base station 124 and changing mud where the truck gets in.

Other issues that may be presented to the one or more system administrators may related to measures to reduce a cost of providing a desired redundancy. The measures may include decreasing a number of communication objects, wireless base stations, network relay devices, user plane functions, control devices, or communication control devices. For example, if each of a set of three or more control devices or communication control devices are operating at a load of 30%, there may be a benefit to reducing the number of control devices to two.

The number of communication objects associated with a terminal device, in some aspects, may be three or greater. For three or more communication objects associated with a terminal device, a connected wireless base station and a communication resource dynamic planning unit may share information regarding the reserved communication devices and communication links for each communication object. Base on the shared information, the communication resource dynamic planning unit may plan and reserve communication devices and communication links for a each of the other communication objects so as not to overlap the same communication devices and communication links among the communication objects. However, if a predetermined redundancy is secured (e.g., there are at least a threshold number of non-overlapping communication paths established), overlapping may be allowed for subsequently established communication paths. For example, for four communication objects in a terminal device, two communication paths that are overlapping may be allowed if the threshold number of non-overlapping communication paths is three (e.g., if triple redundancy is a predetermined minimum redundancy).

In some aspects in which a plurality of wireless base stations share an overlapping coverage area, some radio wave interference may occur. Therefore, measures to reduce or avoid the radio wave interference may be implemented. The measures may involve separation of one or more of frequency, communication time skit, or code in CDMA (code Division Multiple Access) method. In some aspects, a directionality of a radio wave from a plurality of wireless base station may be controlled per every antenna (e.g., antenna 310a and/or 310b of FIG. 3) for a communication object in a terminal device with beamforming technology. A plurality of antennas may be separated in space in a terminal device. For example, a first antenna may be installed at the top of a terminal device, and another antenna may be installed at a lower part of the terminal device.

A control system information storage unit may store information related to the terminal device for executing the invention. Such information may be input via an input means by system operators before or during system operation (e.g., PC, input by the keyboard, input by the Web server). In some aspects, the information is added or modified based on a notification from the terminal device itself.

To secure such information update, any or both of an authentication function unit and a terminal device may have authentication means and information for the authentication. The information may be based on the information stored in an authentication information management unit (e.g., authentication information management unit 431 or FIG. 4) or dedicated information for the update. Different terminal devices, in some aspects, may substitute the notification and authentication by communicating with a control system information storage unit.

In some aspects, a control system information storage unit may identify a plurality of the communication objects in a terminal device dynamically. For example, the communication objects may be associated with a location and, if the communication objects are within a predetermined distance, they can be estimated to be associated (equipped) with the same terminal device. The predetermined distance may be determined based on the distance between an installed position of antennas and the size of the terminal device. In some aspects, a plurality of the communication objects can be identified as being associated with a same terminal device based on a tact such as "only one terminal device exists in an area at the moment" that is derived from system operation schedule.

Further, one or more of a position, a velocity, or an acceleration of a plurality of communication objects located by a location service may be monitored, and if the monitored position, velocity, or acceleration are correlated, they may be determined to be associated with a same terminal device. The determination may be based on an expectation that antennas associated (equipped) with the same terminal device will have a position, a velocity, and/or an acceleration that is correlated.

Figure 12B:
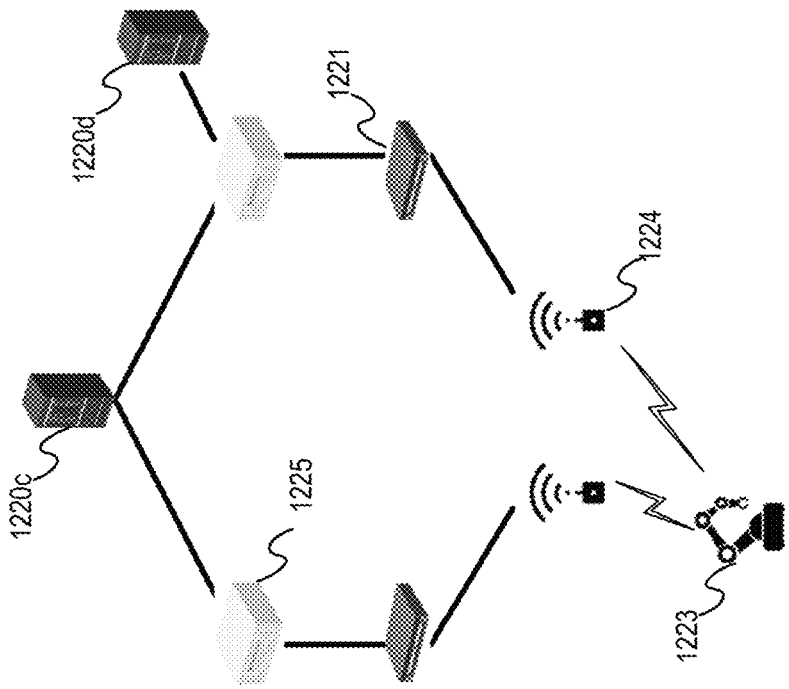
FIG. 12B illustrates that a control network may be implemented as a parallel redundancy protocol network.
Figure 12A:
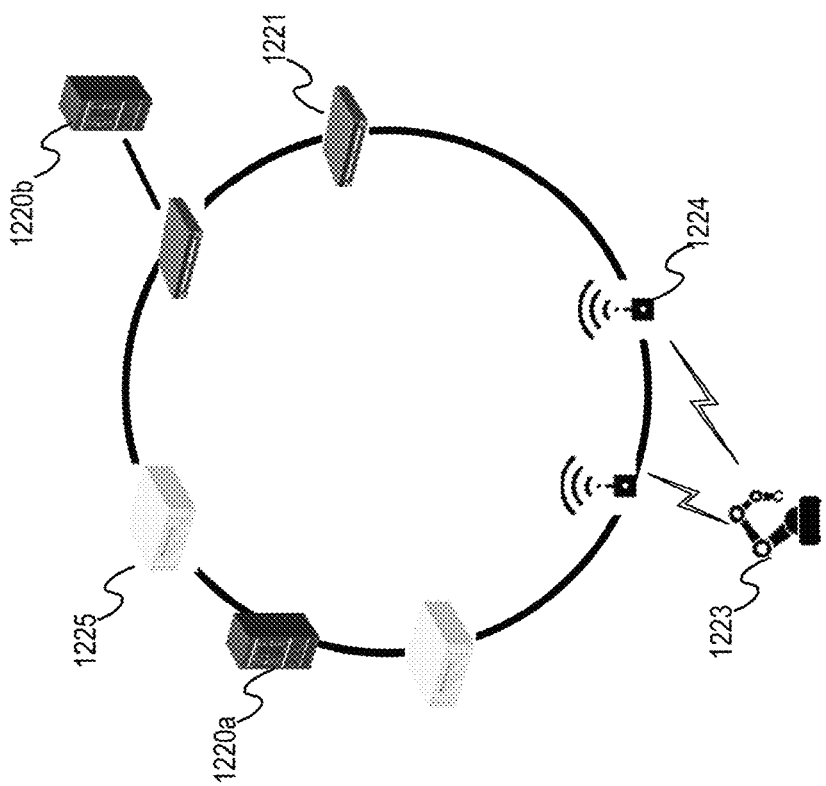
FIG. 12A illustrates that a control network may be implemented as a high-availability seamless redundancy network.

FIGS. 12A and 12B illustrate example structures for a control network for connecting a terminal device 1223 and a control device in accordance with an example implementation. FIG. 12A illustrates that a control network may be implemented as a HSR (e.g., a duplex and/or ring) network as defined in EEC 62439-3 and the control network components (e.g., the wireless base station 1224, the network relay device 1221, and the user plane function 1225) may be configured with the functions defined in IEC 62439-3. In some aspects, a control device may be attached to the network as a singly attached node (SAN) (e.g., control device 1220b), or may be attached by multiple communication links (e.g., control device 1220a). If a control device is a SAN, the planning apparatus may provide (e.g., display) an indication that there is a single point of failure associated with the control device to a system administrator.

FIG. 12B illustrates that a control network may be implemented as a parallel redundancy protocol (PRP) network as defined in IEC 62439-3 and the control network components (e.g., the wireless base station 1224, the network relay device 1221, and the user plane function 1225) may be configured with the functions defined in IEC 62439-3. In some aspects, a control device may be attached to the network as a singly attached node (SAN) (e.g., control device 1220d), or may be attached by multiple communication links (e.g., control device 1220e). If a control device is a SAN, the planning apparatus may provide (e.g., display) an indication that there is a single point of failure associated with the control device to a system administrator.

Figure 13:
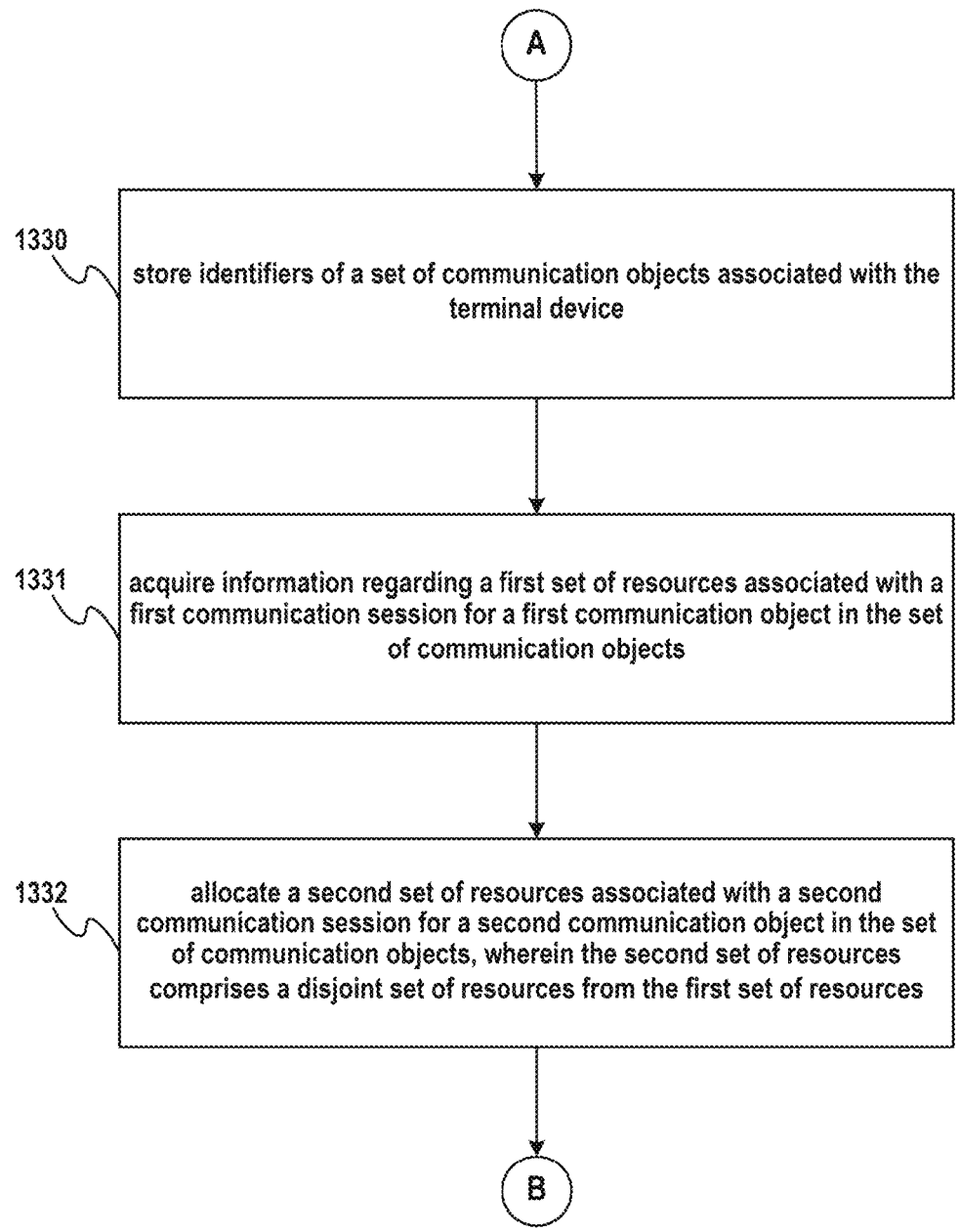
FIG. 13 illustrates a method for resource allocation of a communication session in a network that connects a terminal device and a control device via one or more base stations.

FIG. 13 illustrates a method for resource allocation of a communication session in a network that connects a terminal device and a control device via one or more base stations. The method may be performed by a planning apparatus (e.g., a communication control device 127, 127a, and 127b). At 1330, the planning apparatus may store identifiers of a set of communication objects (e.g., communication units 434a and 434b of FIG. 4) associated with the terminal device. The identifiers, in some aspects, may include identifiers of a plurality of communication objects in each of a set of terminal devices and/or information required to communicate with the set of terminal devices (e.g., an IP address and MAC address for each communication object associated with a terminal device). The information stored at 1330, in some aspects, may include information regarding a mobility of each terminal device in the set of terminal devices (whether each terminal device is mobile or not), information about sensors and actuators associated with each terminal device, information about a computational power of each terminal device, information regarding a communication ability (e.g., which protocols may be used or a bandwidth), an operational status (e.g., an On/Off state, a standby mode of operation, etc.) of each terminal device (or communication unit of the terminal device), an operation schedule, and so on. For example, referring to FIG. 6, the communication control device 127 may store identifiers of the set of communication objects associated with the terminal device in a control system information storage unit 643. Additionally, rally, referring to FIG. 7, storing identifiers of the set of communication objects may include authenticating, at 704, the set of communication units associated with the terminal device and acquire, at 705, the connection status of the communication units in the same terminal device.

At 1331, the planning apparatus may acquire information regarding a fast set of resources associated with a first communication session for a fast communication object in the set of communication objects. In some aspects, the acquired information may be acquired based on an allocation previously performed for the fit communication session by the planning apparatus or based on information received from another planning apparatus regarding the first set of resources. The first set of resources may be a first communication path on the network. The allocation of the fast communication path may include configuring forwarding operations associated with a plurality of protocol layers at one or more forwarding devices associated with the first communication path. Accordingly, the fast communication path may be associated with one or more packet forwarding rules in a network relay device (or a network forwarding device) of the network. The first set of resources may include a first base station.

Finally, at 1332, the planning apparatus may allocate a second set of resources associated with a second communication session for a second communication object in the set of communication objects. In some aspects, the second set of resources may be a disjoint set of resources from the first set of resources. The second set of resources, in some aspects, includes a second communication path on the network. The second communication path, in some aspects, may be associated with one or more packet forwarding rules in a network relay device in the network. In some aspects, the second set of resources includes a second base station. The second set of resources, in some aspects, may be allocated to cause a predetermined communication delay between the fast communication session and the second communication session. The allocation of the second communication path may include configuring forwarding operations associated with a plurality of protocol layers at one or more forwarding devices associated with the second communication path. For example, referring to FIG. 7, the communication control device may allocate, at 706, a set of resources for a communication session between a particular communication unit and a control device.

Figure 15:
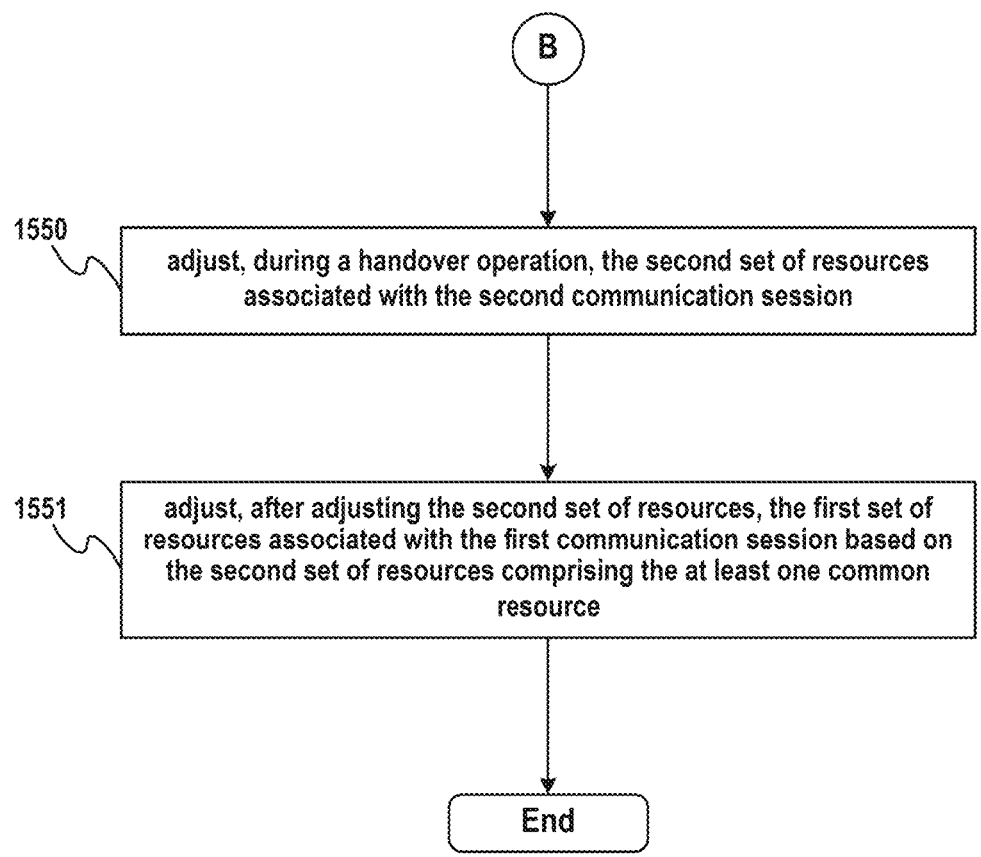
FIG. 15 illustrates additional operations associated with the method of FIG. 13 that may be performed after the initial allocation of the second set of resources as described in FIG. 13.
Figure 16:
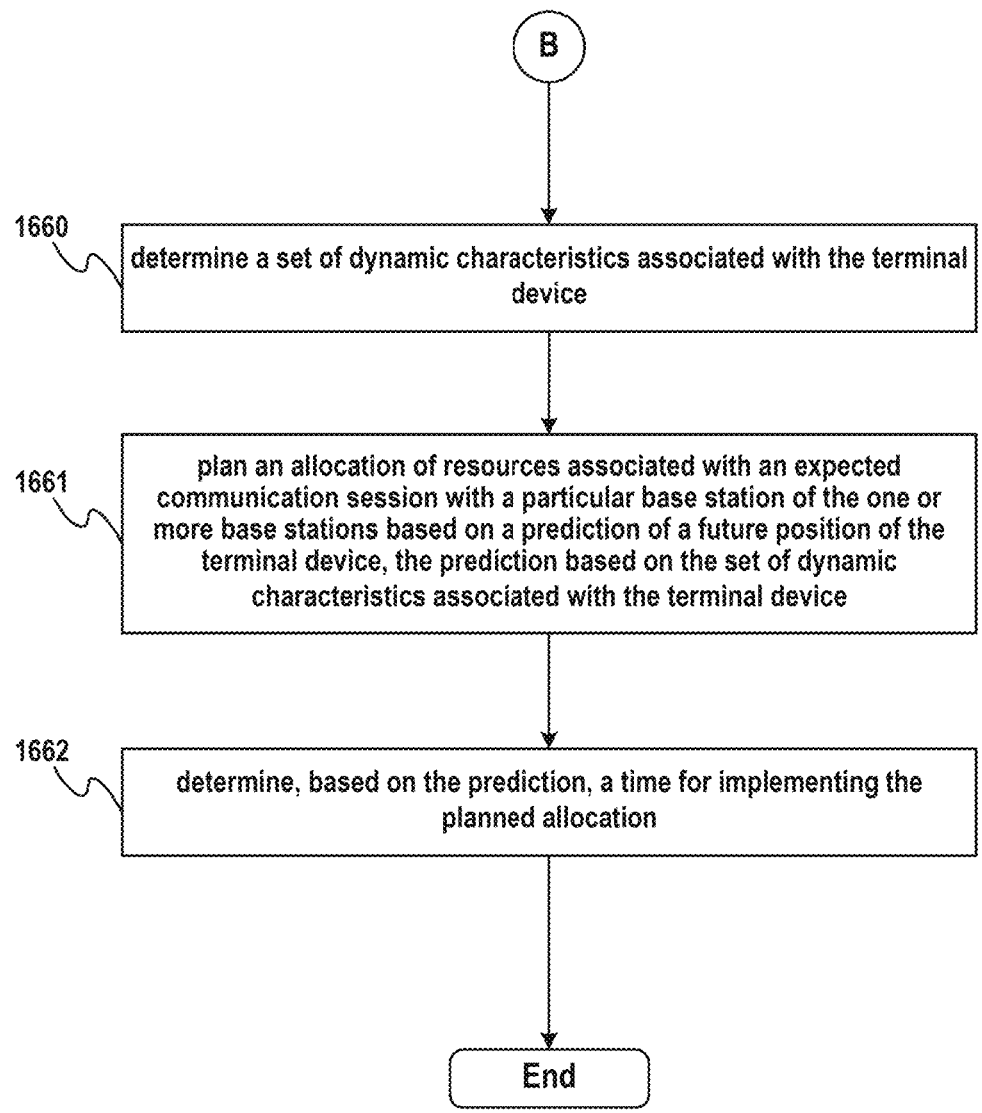
FIG. 16 illustrates additional operations associated with the method of FIG. 13 that may be performed after the initial allocation of the second set of resources as described in FIG. 13.
Figure 17:
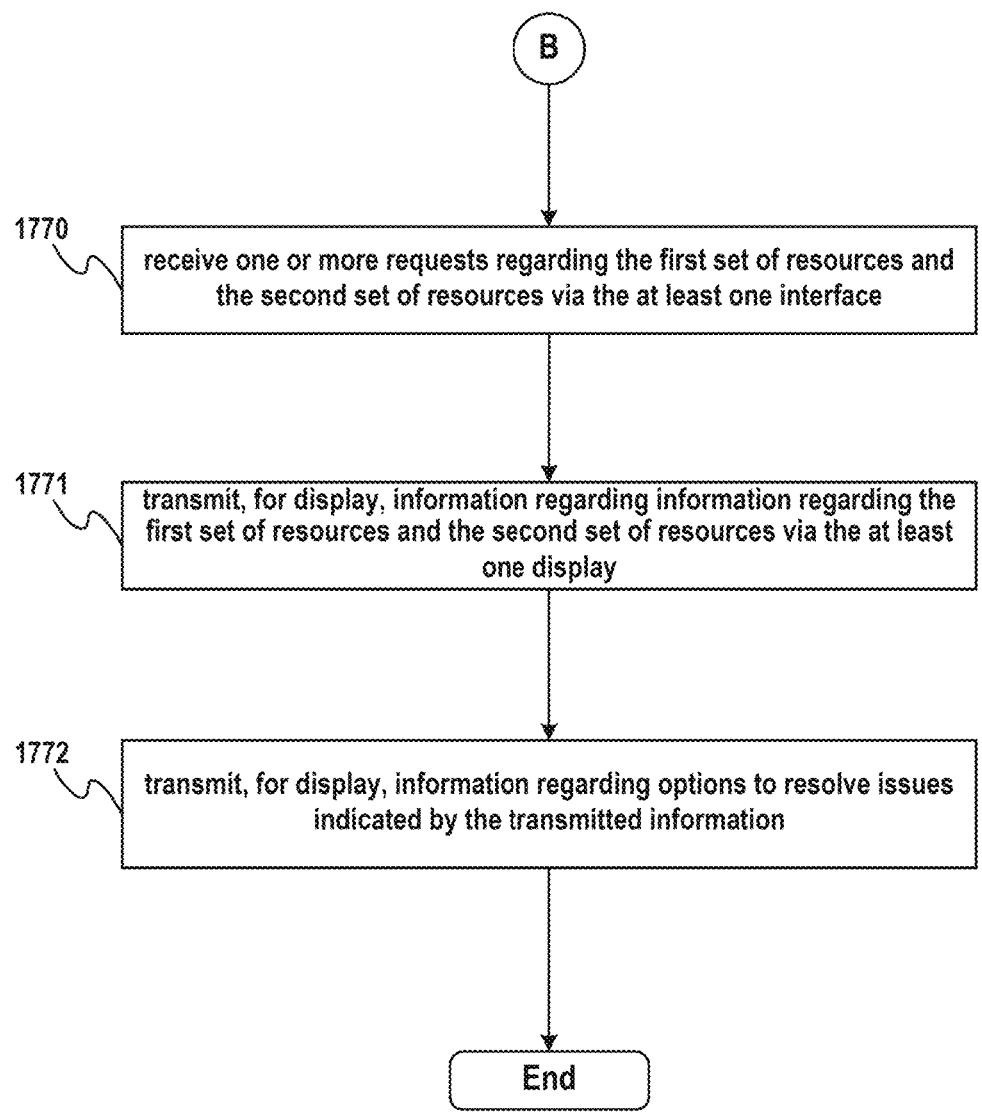
FIG. 17 illustrates additional operations associated with the method of FIG. 13 that may be performed after the initial allocation of the second set of resources as described in FIG. 13.

In some aspects, the planning apparatus may identify a plurality of communication paths for allocation to the second communication session and select a particular candidate communication path from the identified plurality of communication paths for allocation to the second communication session. The particular candidate communication path may be selected based on a set of criteria associated with each candidate path in the plurality of candidate paths. The set of criteria, in some aspects, may include one or more of a communication delay associated with each candidate path, a number of hops between relay devices associated with each candidate path, a communication bandwidth associated with each candidate path, a number of protocol layers used to configure each candidate path, a computational performance of the relay devices associated with each candidate path, a reliability of the relay devices associated with each candidate path, or a computational load of the relay devices associated with each candidate path. Additional operations may precede the operations of the method illustrated in FIG. 13 as indicated by the circled "A" and illustrated in FIGS. 14A and 14B. Additional operations may be performed after the operations of the method illustrated in FIG. 13 as indicated by the circled "B" leading to FIGS. 15, 16, and 17 illustrating different sets of additional operations that may be performed by a planning apparatus.

Figure 14A:
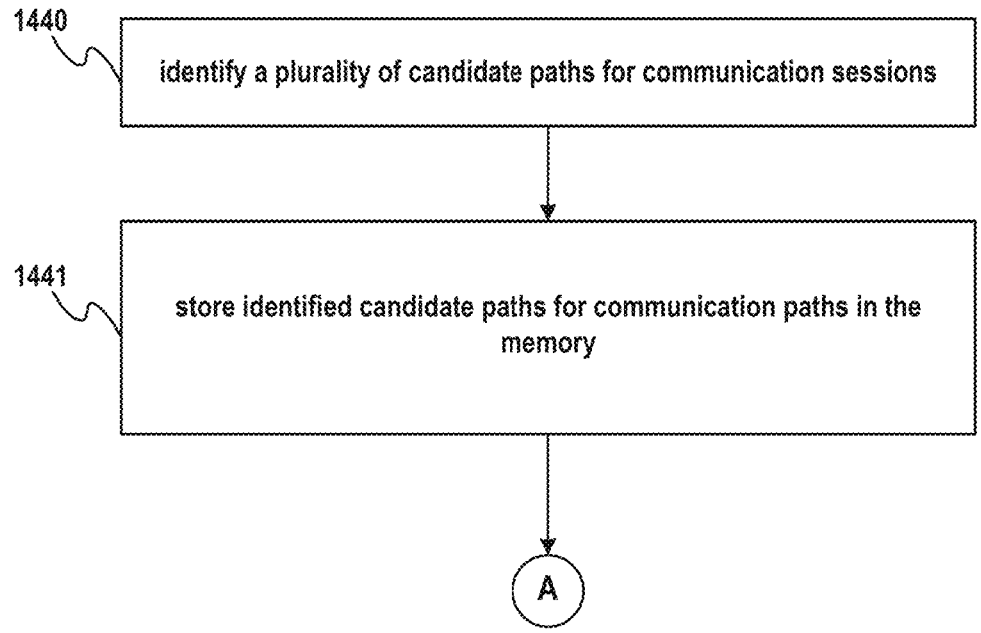
FIG. 14A illustrates additional operations associated with the method of FIG. 13 that the planning apparatus may perform before performing the operations illustrated in FIG. 13

FIGS. 14A and 148 illustrates additional operations associated with the method of FIG. 13 that the planning apparatus may perform before performing the operations illustrated in FIG. 13. At 1440, the planning apparatus may identify a plurality of candidate paths for communication sessions. The plurality of candidate paths, in some aspects, may include at least two communication paths that include disjoint sets of resources as descried above in relation to FIG. 10. Candidate paths may be identified for each of a combination of wireless base stations as different disjoint sets of resources may be identified depending on the wireless base stations connecting to communication objects of a same terminal device as described in relation to FIG. 10.

At 1441, the planning apparatus may store the identified candidate paths. In some aspects, the first set of resources is associated with one of the identified candidate paths. The second set of resources may be allocated (e.g., at 1332) based on an association with one of the identified candidate paths that has already been determined to be disjoint from the path associated with the first set of resources. For example, the particular candidate path may be selected from the plurality of candidate paths at 1332 based on a set of criteria associated with each candidate path in the plurality of candidate paths, the set of criteria including one or more of a communication delay associated with each candidate path, a number of hops between relay devices associated with each candidate path, communication bandwidth associated with each candidate path, a number of protocol layers used to configure each candidate path, a computational performance of the relay devices associated with each candidate path, a reliability of parts used in the relay devices associated with each candidate path, or a computational load of the relay devices associated with each candidate path. In some aspects, identifying the set of disjoint candidate paths may be performed as a background process to make the dynamic allocation take less time and/or processing power.

Figure 14B:
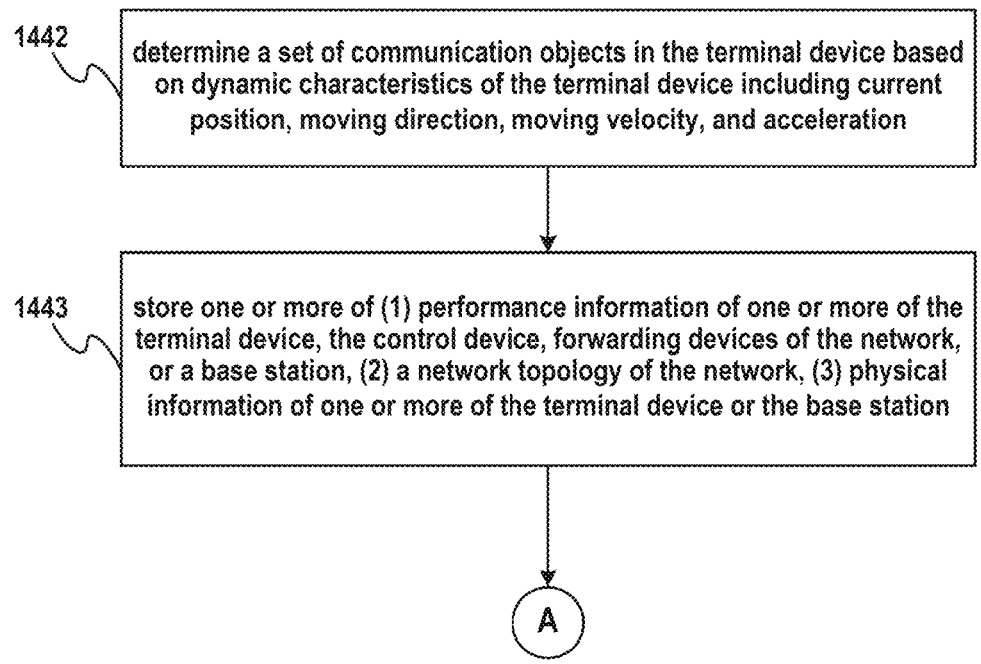
FIG. 14B illustrates additional operations associated with the method of FIG. 13 that the planning apparatus may perform before performing the operations illustrated in FIG. 13.

FIG. 14B illustrates additional operations associated with the method of FIG. 13 that the planning apparatus may perform before performing the operations illustrated in FIG. 13. At 1442, the planning apparatus may determine a set of communication objects in the terminal device based on dynamic characteristics of the terminal device including current position, moving direction, moving velocity, and acceleration. For example, as described in relation to FIG. 10, communication objects with correlated dynamic characteristics may be determined to be associated with a same terminal device.

At 1443, the planning apparatus may store one or more of (1) performance information of one or more of the terminal device, the control device, forwarding devices of the network, or a base station, (2) a network topology of the network, (3) physical information of one or more of the terminal device or the base station. The stored performance intimation, network topology, and/or physical information may be used to allocate at 1332 the second set of resources. For example, the stored information may relate to a set of criteria for selecting a particular communication path from a set of communication paths as described above in relation to FIGS. 10, 13, and 14A.

FIG. 15 illustrates additional operations associated with the method of FIG. 13 that may be performed after the initial allocation of the second set of resources as described in FIG. 13. For example, the additional operations may be performed as part of a handover procedure in which the second communication object disconnects from a fast base station and reestablishes a connection with a third base station. The additional operations may be performed by a planning apparatus (e.g., a communication control device 127, 127*a*, and 127*b*). At 1550, the planning apparatus may adjust, during a handover operation, the second set of resources associated with the second communication session. In some aspects, the planning apparatus may adjust the second set of resources based on detecting one or more of a failure of a base station, a relay device, a communication link, a relocation of a function of the planning apparatus, or a relocation of a function of the relay device associated with the second set of resources. The adjusted second set of resources, in some aspects, may include at least one resource in common with the first set of resources associated with the first communication session. At the time of adjusting the second set of resources, in some aspects, the first set of resources is maintained without adjustment as discussed in relation to FIG. 10.

After the second communication object establishes a communication session based on the adjusted second set of resources, the planning apparatus may, at 1551, adjust the first set of resources associated with the first communication session based on the second set of resources including the at least one common resource. For example, the first set of resources may be adjusted so as to avoid having any communication devices or communication links in common with the adjusted second set of resources as described in relation to FIG. 10.

FIG. 16 illustrates additional operations associated with the method of FIG. 13 that may be performed after the initial allocation of the second set of resources as described in FIG. 13. At 1660, the planning apparatus may determine a set of dynamic characteristics associated with the terminal device. The set of dynamic characteristics, in some aspects, may include one or more of a current position of the terminal device, a direction of a movement of the terminal device, a velocity of the terminal device, or an acceleration of the terminal device. The dynamic characteristics, in some aspects, may be determined based on a synchronization time provided by a time synchronization component (e.g., time synchronization unit 647).

At 1661, the planning apparatus may plan an allocation of resources associated with an expected communication session with a particular base station of the one or more base stations based on a prediction of a future position of the terminal device. In some aspects, the prediction may be based on the set of dynamic characteristics associated with the terminal device. For example, as described in relation to FIG. 10, fora terminal device that is moving in a direction that would take it from a coverage area of first base station to a coverage area of a second base station, the planning apparatus may plan an allocation of resources associated with the second base station in anticipation of the transition between coverage areas.

At 1662, the planning apparatus may determine, based on the prediction, a time for implementing the planned allocation. For example, the prediction may indicate that the terminal device may transition between coverage areas at a particular time. The allocation may be implemented at the predicted time. In some aspects, the time for implementing the planned allocation may trigger the planning apparatus to query a location of the terminal device more frequently around the predicted time.

FIG. 17 illustrates additional operations associated with the method of FIG. 13 that may be performed after the initial allocation of the second set of resources as described in FIG. 13. The planning apparatus may include at least one display and at a least one interface. At 1770, the planning apparatus may receive one or more requests regarding the first set of resources and the second set of resources via the at least one interface. The request may be received from a system operator. In some aspects, the request may be included in a request related to, e.g., a portion, or all, of the network or the communication paths in the network. The request, in some aspects, may be a prior request for monitoring based on a set of conditions or events that may trigger a request regarding the first set of resources and the second set of resources.

At 1771, the planning apparatus may present information regarding the first set of resources and the second set of resources via the at least one display. The information may be presented based on the request as described above. In some aspects, the information is presented based on a detected set of conditions or events and may include a display of any of a change to an installed location of a base station, a change in the performance of one or more of (1) the base station, (2) the terminal device, (3) the control device, and/or (4) a relay device in the network, and/or a change to a network topology of the network. The information presented (e.g., displayed) may be based on the operational experience of the communication between the control terminal device and control device. In some aspects, the information presented may include an overlap of the resources between the first communication session and the second communication session.

Finally, at 1772, the planning apparatus may present options to resolve issues indicated by the presented information. For example, the planning apparatus may present options to resolve an overlap between resources associated with the first communication session and the second communication session. The options, in some aspects, may include the addition of a base station and/or a relay device in the network, and/or changing the network topology of the network.

By the above example implementation, overlap of communication devices and communication links between a terminal device and a control device may be avoided so that there is no single point of failure. Availing a single point of failure increases the reliability of a communication. Further, since, in some aspects, sets of communication paths are planned in advance or communication sessions are planned based on the estimation of the next position of a terminal device in accordance with is dynamic characteristic, communication sessions may be assigned rapidly. Accordingly, the period that redundant communication paths are not provided may be reduced and the reliability of the system can be improved. Further, since, in some aspects, redundant communication paths are established dynamically according to the change of a radio wave environment, it is possible to optimize the number of wireless base stations and the design constraints regarding the install location of the wireless base stations is mitigated. Therefore, the control system can be designed and bulk with reasonable cost.

Figure 18:
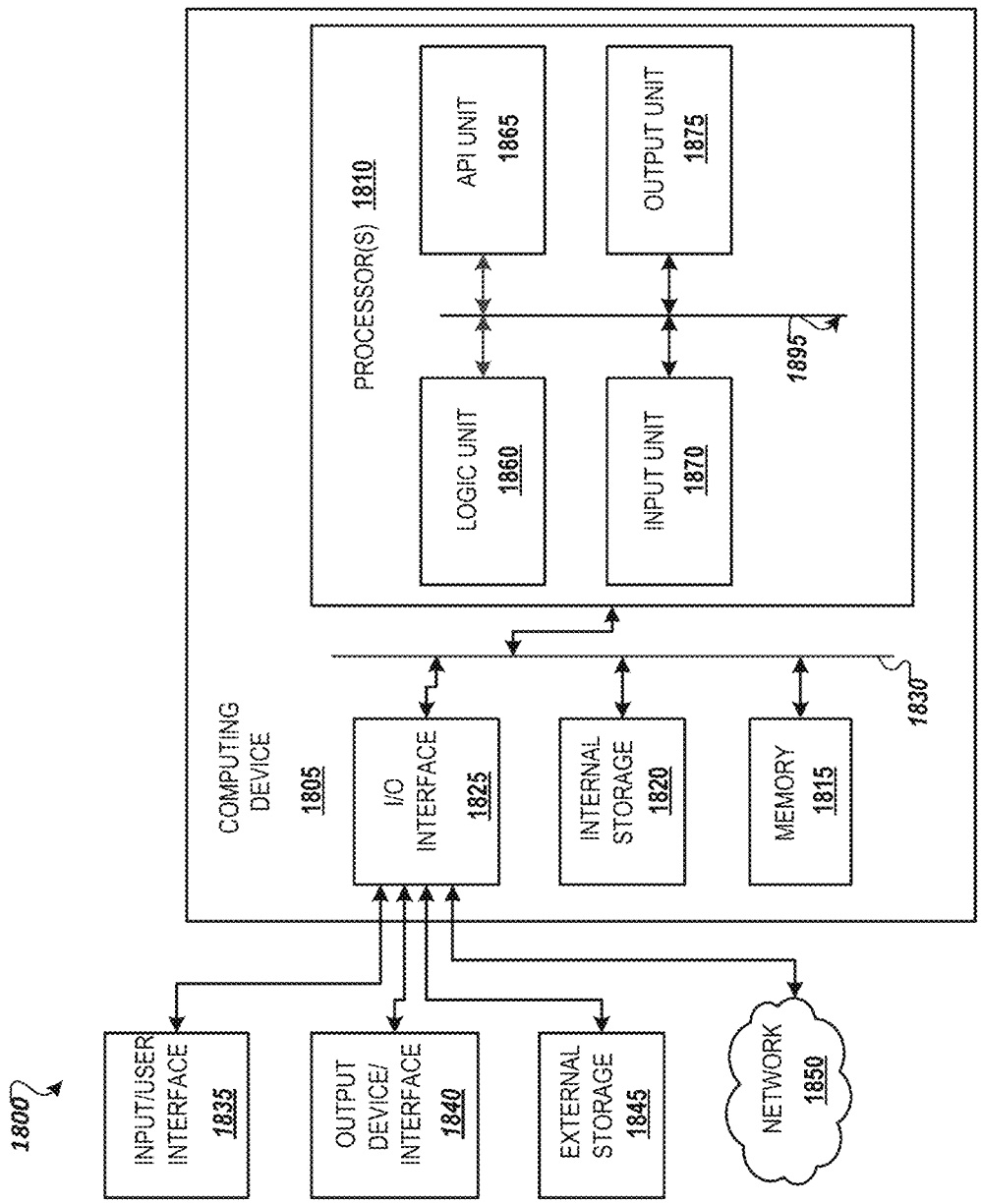
FIG. 18 illustrates an example computing environment with an example computer device suitable for use in some example implementations.

FIG. 18 illustrates an example computing environment with an example computer device suitable for use in some example Implementations. Computer device 1805 in computing environment 1800 can include one or more processing units, cores, or processors 1810, memory 1815 (e.g., RAM, ROM, and/or the like), internal storage 1820 (e.g., magnetic, optical, solid-state storage, and/or organic), and/or IO interface 1825, any of which can be coupled on a communication mechanism or bus 1830 for communicating information or embedded in the computer device 1805. IO interface 1825 is also configured to receive imager from cameras or provide images to projectors or displays, depending on the desired implementation.

Computer device 1805 can be communicatively coupled to input/user interface 1835 and output device/interface 1840. Either one or both of the input/user interface 1835 and output device/interface 1840 can be a wired or wireless interface and can be detachable. Input/user interface 1835 may include any device, component, sensor, or interface, physical or virtual, that can be used to provide input (e.g., buttons, touch-screen Interface, keyboard, a pointing/cursor control, microphone, camera, braille, motion sensor, accelerometer, optical reader, and/or the like). Output device/interface 1840 may include a display, television, monitor, printer, speaker, braille, or the like. In some example implementations, input/user interface 1835 and output device/interface 1840 can be embedded with or physically coupled to the computer device 1805. In other example implementations, other computer devices may function as or provide the functions of input/user interface 1835 and output device/interface 1840 fix a computer device 1805.

Examples of computer device 1805 may include, but are not limited to, highly mobile devices (e.g., smartphones, devices in vehicles and other machines, devices carried by humans and animals, and the like), mobile devices (e.g., tablets, notebooks, laptop, personal computers, portable televisions, radios, and the like), and devices not designed for mobility (e.g., desktop computers, other computers, information kiosks, televisions with one or more processors embedded therein and/or coupled thereto, radios, and the lice).

Computer device 1805 can be communicatively coupled (e.g., via IO interface 1825) to external storage 1845 and network 1850 for communicating with any number of networked components, devices, and systems, including one or more computer devices of the same or different configuration. Computer device 1805 or any connected computer device can be functioning as, providing services of, or referred to as a server, client, thin server, general machine, special-purpose machine, or another label.

IO interface 1825 can include but is not limited to, wired and/or wireless interfaces using any communication or IO protocols or standards (e.g., Ethernet, 1802.11x, Universal System Bus, WiMax, modem, a cellular network protocol, and the like) for communicating information to and/or from at least all the connected components, devices, and network in computing environment 1800. Network 1850 can be any network or combination of networks (e.g., the Internet, local area network, wide area network, a telephonic network, a cellular network, satellite network, and the lice).

Computer device 1805 can use and/or communicate using computer-usable or computer readable media, including transitory media and non-transitory media. Transitory media include transmission media (e.g., metal cables, fiber optics), signals, carrier waves, and the bite. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1810 can execute under any operating system (OS) (not shown), in a native or virtual environment. One or more applications can be deployed that include logic unit 1860, application programming interface (API) unit 1865, input unit 1870, output unit 1875, and inter-unit communication mechanism 1895 for the different units to communicate with each other, with the OS, and with other applications (not shown). The described units and elements can be varied in design, function, configuration, or implementation and are not limited to the descriptions provided. Processor(s) 1810 can be in the form of hardware processors such as central processing units (CPUs) or in a combination of hardware and software units.

In some example implementations, when information or an execution instruction is received by API unit 1865, it may be communicated to one or more other units (e.g., logic unit 1860, input unit 1870, output unit 1875). In some instances, logic unit 1860 may be configured to control the information flow among the units and direct the services provided by API unit 1865, the input unit 1870, the output unit 1875, in some example implementations described above. For example, the flow of one or more processes or implementations may be controlled by logic unit 1860 alone or in cod function with API unit 1865. The input unit 1870 may be configured to obtain input for the calculations described in the example implementations, and the output unit 1875 may be configured to provide an output based on the calculations described in example implementations.

Processor(s) 1810 can be configured to store identifiers of a set of communication objects associated with the terminal device. The processor(s) 1810 may also be configured to acquire information regarding a first set of resources associated with a first communication session for a first communication object in the set of communication objects. The processor(s) 1810 may further be configured to allocate a second set of resources associated with a second communication session for a second communication object in the set of communication objects, where the second set of resources includes a disjoint set of resources from the first set of resources. The processor(s) 1810 may further be configured to adjust, during a handover operation, the second set of resources associated with the second communication session, where the adjusted second set of resources includes at least one resource it common with the first set of resources associated with the first communication session, where the first set of resources is maintained without adjustment. The processor(s) 1810 may also be configured to adjust, after adjusting the second set of resources, the first set of resources associated with the first communication session based on the second set of resources including the at least one common resource. The processor(s) 1810 may also be configured to identify a plurality of candidate paths for communication sessions, the plurality of candidate paths including at least two communication paths that include disjoint sets of resources. The processor(s) 1810 may also be configured to store identified candidate paths for communication paths in the memory, where allocating the second set of resources associated with the second communication session includes selecting a particular candidate path from the stored plurality of candidate paths and the second set of resources is associated with the selected particular candidate path. The processor(s) 1810 may further be configured to select the particular candidate path from the plurality of candidate paths based on a set of criteria associated with each candidate path in the plurality of candidate paths, the set of criteria including one or more of a communication delay associated with each candidate path, a number of hops between relay devices associated with each candidate path, communication bandwidth associated with each candidate path, a number of protocol layers used to configure each candidate path, a computational performance of the relay devices associated with each candidate path, a reliability of parts used in the relay devices associated with each candidate path, or a computational load of the relay devices associated with each candidate path. The processor(s) 1810 may also be configured to allocate at least one of the first communication path or the second communication path by configuring forwarding operations associated with a plurality of protocol layers at one or more forwarding devices associated with at least one of the first communication path or the second communication path. The processor(s) 1810 may further be configured to determine a set of dynamic characteristics associated with the terminal device, the set of dynamic characteristics including one or more of a current position of the terminal device, a direction of a movement of the terminal device, a velocity of the terminal device, or an acceleration of the terminal device. The processor(s) 1810 may also be configured to plan an allocation of resources associated with an expected communication session with a particular base station of the one or more base stations based on a prediction of a future position of the terminal device, the prediction based on the set of dynamic characteristics associated with the terminal device. The processor(s) 1810 may further be configured to determine, based on the prediction, a time for implementing the planned allocation. The processor(s) 1810 may further be configured to store one or more of (1) performance information of one cc more of the terminal device, the control device, forwarding devices of the network, or a base station, (2) a network topology of the network, (3) physical information of one or more of the terminal device or the base station. The processor(s) 1810 may further be configured to detect one or more of a failure of a base station, a relay device, a communication link, a relocation of a function of the planning apparatus, or a relocation of a function of the relay device associated with the second set of resources. The processor(s) 1810 may further be configured to allocate, based on the detected failure, a third set of resources for the second communication object. The processor(s) 1810 may further be configured to receive one or more requests regarding the first set of resources and the second set of resources via the at least one external interface. The processor(s) 1810 may further be configured to transmit information regarding the first set of resources and the second set of resources via the at least one external interface for display. The processor(s) 1810 may further be configured to determine a set of communication objects in the terminal device based on dynamic characteristics of the terminal device including current position, moving direction, moving velocity, and acceleration. The processor(s) 1810 may further be configured to transmit, for display, information regarding one or more of a change to an installed location of a base station, a change in the performance of one or more of (1) the base station, (2) the terminal device, (3) the control device, and/or (4) a relay device in the network, a change to a network topology of the network, or an overlap of communication resources between the first communication session and the second communication session. The processor(s) 1810 may further be configured to transmit, for display, information regarding options to resolve an overlap of communication resources including an addition of one or more of a base station or relay device in the network, or changing of the network topology of the network.

Some portions of the detailed description are presented in terms of algorithms and symbolic representations of operations within a computer. These algorithmic descriptions and symbolic representations are the means used by those skilled in the data processing arts to convey the essence of their innovations to others skilled in the an. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing" "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include medium such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or nave processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed:

1. A planning apparatus for resource allocation of a communication session in a network that connects a terminal device and a control device via one or more base stations, the planning apparatus comprising:
    a memory; and
    at least one processor coupled to the memory and configured to:
        store identifier of a set of communication objects associated with the terminal device;
        acquire information regarding a first set of resources associated with a first communication session for a first communication object in the set of communication objects; and
        allocate a second set of resources associated with a second communication session for a second communication object in the set of communication objects, wherein the second set of resources comprises a disjoint set of resources from the first set of resources,
        identify a plurality of candidate paths for communication sessions, the plurality of candidate paths including at least two communication paths that comprise disjoint sets of resources;
        store identification candidate paths for communication paths in the memory, wherein allocating the second set of resources associated with the second communication session comprises selecting a particular candidate path from the stored plurality of candidate paths and the second set of resources is associated with the selected particular candidate path; and select the particular candidate from the plurality of candidate paths based on a set of criteria associated with each candidate path in the plurality of candidate paths, the set of criteria comprising a reliability of parts used in the relay devices associated with each candidate path, wherein a first device is configured to (1) generate, for a first communication to a second device, first and second duplicate packets for transmission via each of the first set of resources and the second set of resources, and a second device is configured to (1) process a first-received packet of the first and second duplicate packets generated by the first device and (2) discard, a second-received packet of the first and second duplicate packets based on identifying the second-received packet as a duplication of the first-received packet, wherein at least one of (1) the first device is the terminal device and the second device is the control device or (2) the first device is the control device and the second device is the terminal device.

2. The planning apparatus of claim 1, wherein the first set of resources comprises a first communication path on the network and the second set of resources comprises a second communication path on the network.

3. The planning apparatus of claim 2, wherein each of the first communication path and the second communication path is associated with one or more packet forwarding rules in a network relay device in the network.

4. The planning apparatus of claim 2, the at least one processor further configured to:

adjust, during a handover operation, the second set of resources associated with the second communication session, wherein the adjusted second set of resources comprises at least one resource in common with the first set of resources associated with the first communication session, wherein the first set of resource is maintained without adjustment.

5. The planning apparatus of claim 4, the at least one processor further configured to:

adjust, after adjusting the second set of resources, the first set of resources associated with the first communication session based on the second set of resources comprising the at least one common resource.

6. The planning apparatus of claim 5, wherein the first set of resources comprises a first base station and the second set of resources comprises a second base station.

7. The planning apparatus of claim 6, wherein during the handover operation, the first communication object of the terminal device disconnects from the first base station and connects to a third base station.

8. The planning apparatus of claim 2, the at least one processor further configured to:

allocate at least one of the first communication path or the second communication path by configuring forwarding operations associated with the plurality of protocol layers at one or more forwarding devices associated with at least one of the first communication path or the second communication path, wherein each forwarding operation is associated with one or more of the plurality of protocol layers.

9. The planning apparatus of claim 1, the at least one processor further configured to:

select the particular candidate path from the plurality of candidate paths based on a set of criteria associated with each candidate path in the plurality of candidate paths, the set of criteria comprising one or more of a communication delay associated with each candidate path, a number of hops between relay devices associated with each candidate path, communication bandwidth associated with each candidate path, a number of protocol layers used to configure each candidate path, a computational performance of the relay devices associated with each candidate path, or a computational load of the relay devices associated with each candidate path.

10. The planning apparatus of claim 1, the at least one processor further configured to:

determine a set of dynamic characteristic associated with the terminal device, the set of dynamic characteristics comprising one or more of a current position of the terminal device or a direction of a movement of the terminal device; and plan an allocation of resources associated with an expected communication session with a particular base station of the one or more base stations based on a prediction of a future position of the terminal device, the predication based on the set of dynamic characteristic associated with the terminal device.

11. The planning apparatus of claim 10, the at least one processor further configured to:

determine, based on the prediction, a time for implementing the planned allocation of resources.

12. The planning apparatus of claim 10, further comprising a time synchronization component, wherein the set of dynamic characteristics is determined based on a synchronization time provided by the time synchronization component.

13. The planning apparatus of claim 1, the at least one processor further configured to:

store one or more of (1) performance information of the one or more of the terminal device, the control device, forwarding devices of the network, or a base station, (2) a network topology of the network, (3) physical information of one or more of the terminal device or the base station.

14. The planning apparatus of claim 1, the at least one processor further configured to:

detect one or more of a failure of a base station, a relay device, a communication link, a relation of a function of the planning apparatus, or a relocation of a function of the relay device associated with the second set of resources; and allocate, based on the detected failure, a third set of resources for the second communication object.

15. The planning apparatus of claim 1, further comprising at least one external interface, the at least one processor further configured to:

receive one or more requests regarding the first set of resources and the second set of resources via the at least one external interface; and transmit information regarding the first set of resources and the second set of resources via the at least one external interface for display.

16. The planning apparatus of claim 15, the at least one processor further configured to:

transmit, for display, information regarding one or more of a change to an installed location of a base station, a change in a performance of one or more of (1) the base station, (2) the terminal device, (3) the control device, and/or (4) a relay device in the network, a change to a network topology of the network, or an overlap of communication resources between the first communication session and the second communication session; and transmit, for display, information regarding options to resolve the overlap of communication resources, wherein the transmitted options include addition of one or more of a base t station or a relay device in the network, or changing of the network topology of the network.

17. The planning apparatus of claim 1, wherein the network comprises a duplex network comprising a ring network.

18. The planning apparatus of claim 1, the at least one processor further configured to:

determine the set of communication objects in the terminal device based on dynamic characters of the terminal device including current position, moving directions, moving velocity, and acceleration.

19. The planning apparatus of claim 1, the at least one processor further configured to:

determine a set of dynamic characteristic associated with the terminal device, the set of dynamic characteristics comprising one or more of a velocity of the terminal device or an acceleration of the terminal device and;

plan an allocation of resources associated with an expected communication session with a particular base station of the one or more base stations based on a prediction of a future position of the terminal device, the predication prediction based on the set of dynamic characteristic associated with the terminal device.

20. The planning apparatus of claim 1, wherein the first communication session and the second communication session are allocated to cause a predetermined communication delay between the first communication session and the second communication session.

* * * * *